United States Patent
Suzuki et al.

(10) Patent No.: US 9,226,287 B2
(45) Date of Patent: *Dec. 29, 2015

(54) WIRELESS COMMUNICATION SYSTEM, BASE STATION APPARATUS, MOBILE STATION APPARATUS, WIRELESS COMMUNICATION METHOD AND INTEGRATED CIRCUIT

(71) Applicant: SHARP KABUSHIKI KAISHA, Osaka-shi, Osaka (JP)

(72) Inventors: Shoichi Suzuki, Osaka (JP); Daiichiro Nakashima, Osaka (JP); Toshizo Nogami, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,258

(22) Filed: Jul. 22, 2014

(65) Prior Publication Data

US 2014/0334412 A1  Nov. 13, 2014

Related U.S. Application Data

(62) Division of application No. 13/580,507, filed as application No. PCT/JP2011/054981 on Mar. 3, 2011, now Pat. No. 8,842,585.

(30) Foreign Application Priority Data

Mar. 4, 2010  (JP) ................................. 2010-047293

(51) Int. Cl.
*H04L 5/14* (2006.01)
*H04W 72/04* (2009.01)
(Continued)

(52) U.S. Cl.
CPC ............. *H04W 72/042* (2013.01); *H04L 5/001* (2013.01); *H04L 5/0037* (2013.01); *H04L 5/0053* (2013.01); *H04W 88/02* (2013.01); *H04W 88/08* (2013.01); *H04W 88/12* (2013.01)

(58) Field of Classification Search
CPC ... H04W 72/042; H04W 88/12; H04W 88/08; H04W 88/02; H04L 5/0037; H04L 5/0053; H04L 5/001
USPC .......................................... 370/278, 282, 485
See application file for complete search history.

(56) References Cited

U.S. PATENT DOCUMENTS 8,260,356 B2 * 9/2012 Nam et al. .................... 455/561
8,340,069 B2   12/2012 Qu et al.
(Continued)

FOREIGN PATENT DOCUMENTS

JP           2013-533649 A    8/2013
WO     WO 2010/098289 A1    9/2010

OTHER PUBLICATIONS

3rd Generation Partnership Project, Technical Specification Group Radio Access Network, Evolved Universal Terrestrial Radio Access (E-UTRA), Physical layer procedures, Release 9, 3GPP TS 36.213 V9.0.1, Dec. 2009.

(Continued)

*Primary Examiner* — Jay P Patel
(74) *Attorney, Agent, or Firm* — Birch, Stewart, Kolasch & Birch, LLP

(57) ABSTRACT

A terminal apparatus that is set to monitor physical downlink control channel candidates in a common search space and a user equipment-specific search space on a downlink component carrier, which are with cyclic redundancy check scrambled by C-RNTI (Cell Radio Network Temporary Identifier), with a same first control channel element index, and with downlink control information of a common payload size and different downlink control information field sets. The terminal apparatus also assumes that, for the physical downlink control channel candidates with the cyclic redundancy check scrambled by the C-RNTI, only either a physical downlink control channel in the common search space or a physical downlink control channel in the user equipment-specific search space is transmitted on the downlink component carrier.

16 Claims, 9 Drawing Sheets

(51) Int. Cl.
*H04L 5/00* (2006.01)
*H04W 88/02* (2009.01)
*H04W 88/08* (2009.01)
*H04W 88/12* (2009.01)

(56) References Cited

U.S. PATENT DOCUMENTS

| | | | |
|---|---|---|---|
| 8,401,542 | B2 | 3/2013 | Chung et al. |
| 2009/0088148 | A1 | 4/2009 | Chung et al. |
| 2009/0161618 | A1 | 6/2009 | Johansson et al. |
| 2009/0238091 | A1 | 9/2009 | Kim et al. |
| 2010/0157922 | A1 | 6/2010 | Kim et al. |
| 2010/0303036 | A1 | 12/2010 | McBeath et al. |
| 2010/0304689 | A1 | 12/2010 | McBeath et al. |
| 2010/0316146 | A1 | 12/2010 | McBeath et al. |
| 2010/0317360 | A1 | 12/2010 | McBeath et al. |
| 2010/0323709 | A1* | 12/2010 | Nam et al. ............ 455/450 |
| 2010/0331030 | A1* | 12/2010 | Nory et al. ............ 455/509 |
| 2011/0021228 | A1 | 1/2011 | Kim et al. |
| 2011/0038275 | A1 | 2/2011 | Kim et al. |
| 2011/0070845 | A1* | 3/2011 | Chen et al. ............ 455/91 |
| 2011/0076962 | A1* | 3/2011 | Chen et al. ............ 455/68 |
| 2011/0223924 | A1* | 9/2011 | Lohr et al. ............ 455/450 |
| 2011/0228724 | A1 | 9/2011 | Gaal et al. |
| 2011/0228732 | A1* | 9/2011 | Luo et al. ............ 370/329 |
| 2011/0292891 | A1 | 12/2011 | Hsieh et al. |
| 2011/0299513 | A1 | 12/2011 | Suzuki et al. |
| 2012/0051270 | A1 | 3/2012 | Chen et al. |
| 2012/0063413 | A1 | 3/2012 | Kroener et al. |
| 2012/0093112 | A1 | 4/2012 | Qu et al. |
| 2012/0176884 | A1 | 7/2012 | Zhang et al. |
| 2012/0236812 | A1* | 9/2012 | Chen et al. ............ 370/329 |
| 2012/0327891 | A1* | 12/2012 | Nam et al. ............ 370/329 |
| 2013/0010619 | A1* | 1/2013 | Fong et al. ............ 370/252 |
| 2013/0051214 | A1* | 2/2013 | Fong et al. ............ 370/216 |
| 2013/0058240 | A1* | 3/2013 | Kim et al. ............ 370/252 |
| 2013/0107849 | A1* | 5/2013 | Park ............ 370/329 |
| 2013/0142142 | A1 | 6/2013 | McBeath et al. |
| 2013/0188505 | A1* | 7/2013 | Nory et al. ............ 370/252 |

OTHER PUBLICATIONS

Ericsson et al;, "Way forward on handling of overlap betwen common/UE-specific search spaces for cross-CC scheduling", TSG-RAN WG1 Meeting #60bis R1-102511, Beijing, China, Apr. 12-16, 2010.
Ericsson, "Control signaling for carrier aggregation", TSG-RAN WG1 #55bis, R1-090375, Jan. 12-16, 2009.
Ericsson, "Summary of email discussion on Uplink transmission scheme", TSG-RAN WG1 #55, R1-084375, Nov. 10-14, 2008.
Ericsson, ST-Ericsson, "On collision between common and UE specific search spaces", 6.2.3.1, 3GPP TSG RAN WG1 Meeting #61bis R1-103505, Dresden, Germany, Jun. 28-Jul. 2, 2010.
Huawei, "Remaining Issues on Carrier Indicator Field", 3GPP TSG RAN WG1 meeting #60, R1-101047, Feb. 22-26, 2010.
International Search Report issued in PCT/JP2010/052639 mailed Apr. 13, 2010.
International Search Report issued in PCT/JP2011/054981 mailed Apr. 5, 2011.
LG Electronics, "Carrier indicator field related issues for cross-carrier scheduling in carrier aggregation", 3GPP TSG RAN WG1 #60, R1-101346, Feb. 22-26, 2010.
LG Electronics, "Issue on handling of search space collision in case of cross-carrier scheduling", 3GPP TSG RAN WG1 #60bis, R1-102411, Apr. 12-16, 2010.
LGE, Philips, Nokia, Nokia Siemens Networks, Huawei, RIM, ETRI, Pantech, ZTE, Panasonic, Ericsson, ST-Ericsson, Samsung, CATT, Qualcomm, NTT Docomo, "Way forward on handling of overlap between search spaces", TSG-RAN WG1 Meeting #61bis R1-104233, Dresden, Germany, Jun. 28-Jul. 2, 2010.
Motorola, "PDCCH Search Space Assignment and Signaling", 3GPP TSG RAN1 #52, R1-080731, Feb. 11-15, 2008.
Nokia, "Summary of email discussion on support for wider bandwidth", TSG-RAN WG1 #55, R1-084316, Nov. 14-18, 2008.
NTT Docomo, "DL Layered Control Signal Structure in LTE-Advanced", 3GPP TSG RAN WG1 Meeting #55, R1-084248, Nov. 10-14, 2008.
Panasonic, "Handling of overlapping common search space and UE-specific search space for cross carrier scheduling", 6.2.3.3, 3GPP TSG-RAN WG1 Meeting #60bis R1-102018, Beijing, China, Apr. 12-16, 2010.
Panasonic, "PDCCH with cross carrier operation", 3GPP TSG-RAN WG1 Meeting #60, R1-101249, Jan. 22-26, 2010.
Qualcomm Europe, "Additional details on confusing multiple PDCCH aggregation levels", 3GPP TSG-RAN WG1 #54, R1-083169, Aug. 18-22, 2008.
Qualcomm Europe, "Confusing multiple PDCCH aggregation levels", 3GPP TSG-RAN WG1 #53bis, R1-082544, Jun. 30-Jul. 4, 2008.
Research in Motion UK Limited, "Carrier Indication for Carrier Aggregation", 3GPP TSG RAN WG1 Meeting #58, R1-093296, Aug. 24-28, 2009.
Samsung, "PDCCH Structure for LTE-A", 3GPP TSG RAN WG1 #55, R1-084165, Nov. 10-14, 2008.
U.S. Notice of Allowance issued in U.S. Appl. No. 13/580,507 on May 12, 2014.
U.S. Office Action issued in U.S. Appl. No. 13/580,507 on Jan. 21, 2014.

* cited by examiner

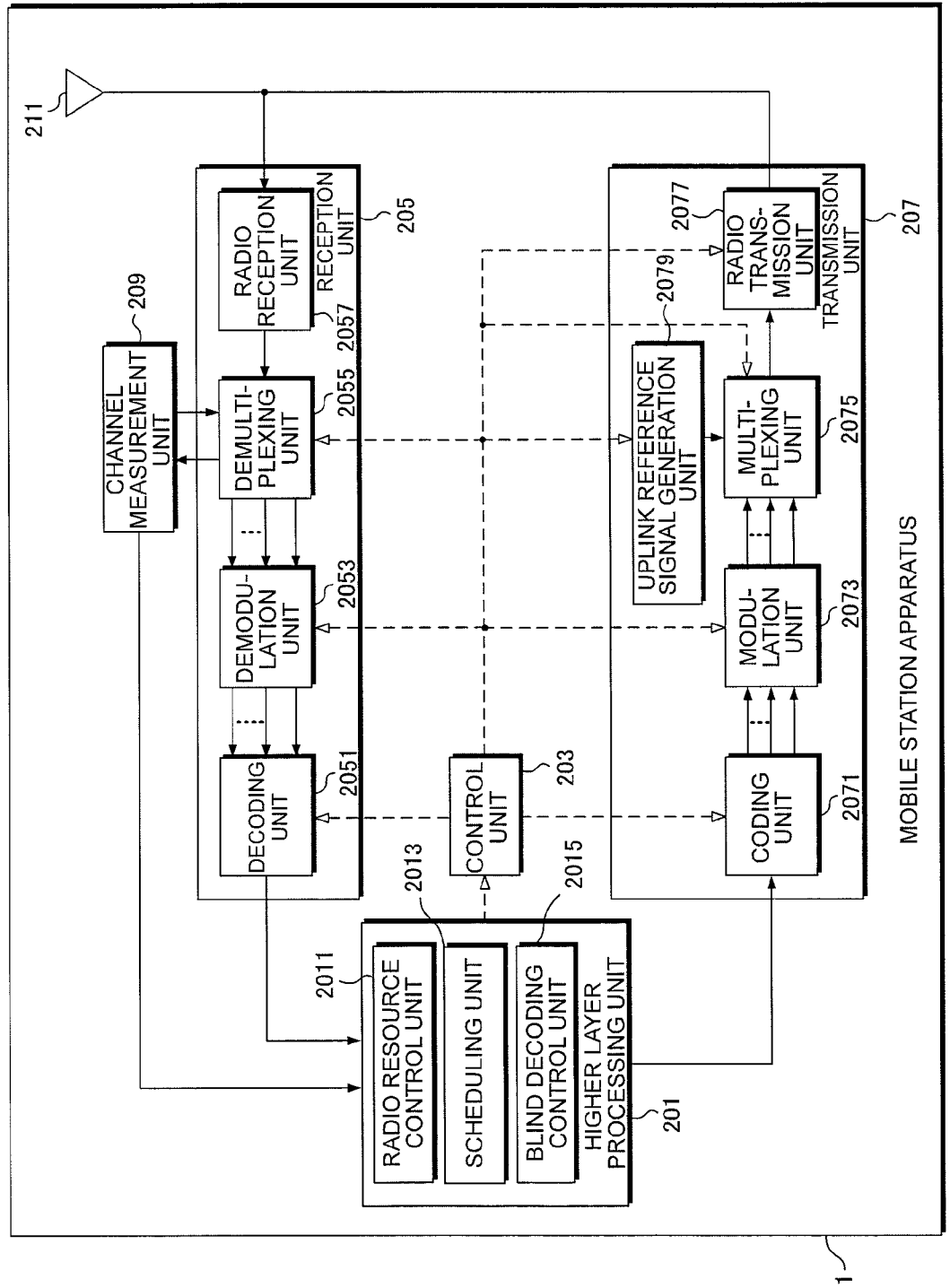

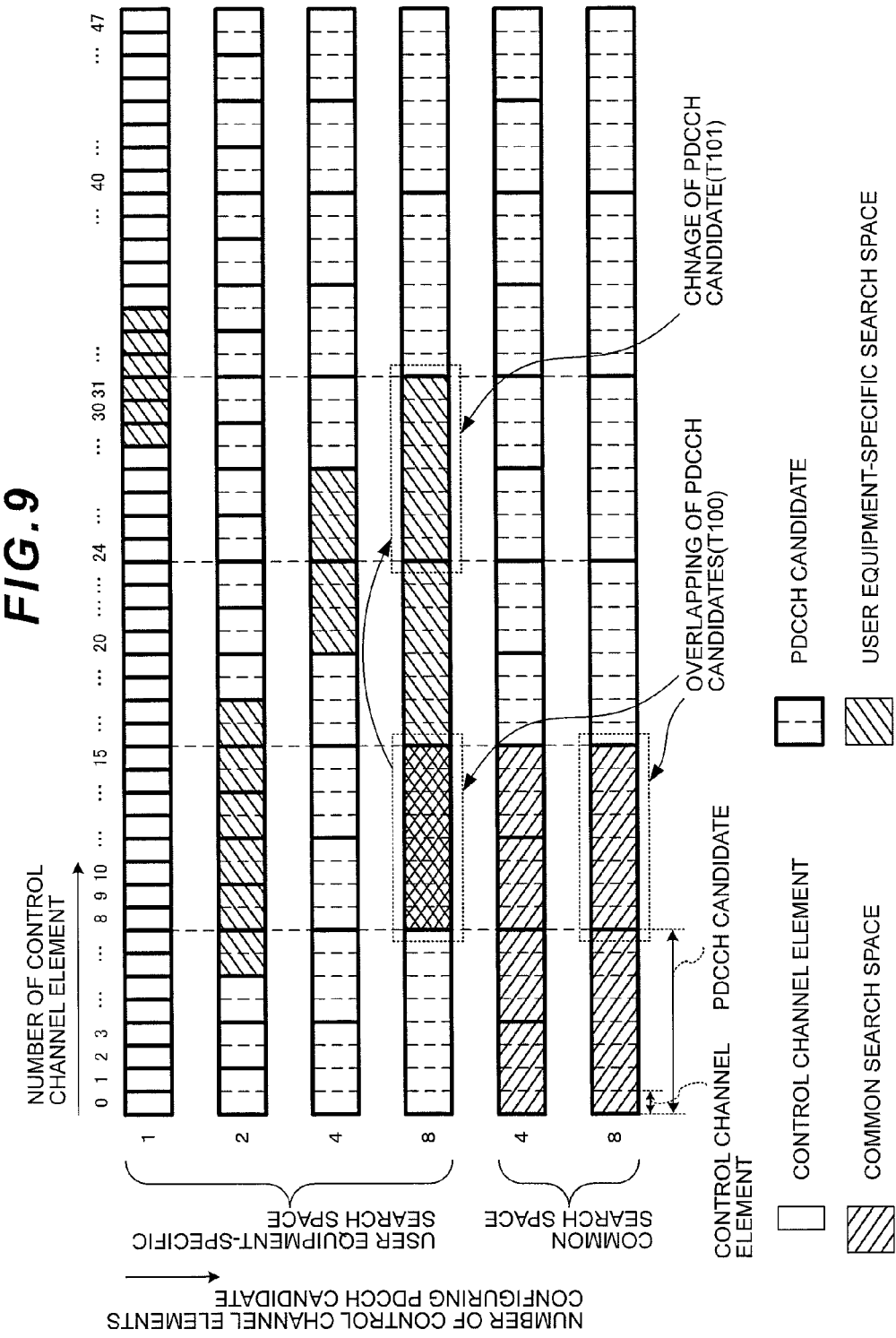

WIRELESS COMMUNICATION SYSTEM, BASE STATION APPARATUS, MOBILE STATION APPARATUS, WIRELESS COMMUNICATION METHOD AND INTEGRATED CIRCUIT

This application is a Divisional of copending application Ser. No. 13/580,507, filed on Nov. 6, 2012, which was filed as PCT International Application No. PCT/JP2011/054981 on Mar. 3, 2011, which claims the benefit under 35 U.S.C. §119 (a) to Patent Application No. 2010-047293, filed in Japan on Mar. 4, 2010, all of which are hereby expressly incorporated by reference into the present application.

TECHNICAL FIELD

The present invention relates to a wireless communication system, a base station apparatus, a mobile station apparatus, a wireless communication method, and an integrated circuit.

BACKGROUND ART

In 3GPP (3rd Generation Partnership Project), has been examined evolution of a radio access system and a radio network of cellular mobile communication (hereinafter referred to as "LTE (Long Term Evolution)" or "EUTRA (Evolved Universal Terrestrial Radio Access)"). In the LTE, an OFDM (Orthogonal Frequency Division Multiplexing) system, which is multicarrier transmission, is used as a communication system for wireless communication from a base station apparatus to a mobile station apparatus (downlink). In addition, an SC-FDMA (Single-Carrier Frequency Division Multiple Access) system, which is single career transmission, is used as a communication system for wireless communication from the mobile station apparatus to the base station apparatus (uplink).

In the LTE, the base station apparatus decides radio resource assignment, a coding rate, a modulation scheme, etc. of a PUSCH (Physical Uplink Shared Channel), which is the channel for data transmission transmitted by the mobile station apparatus and of a PDSCH (Physical Downlink Shared Channel), which is the channel for data transmission transmitted by the base station apparatus. In addition, the base station apparatus transmits DCI (Downlink Control Information) indicating the radio resource assignment to the mobile station apparatus using a PDCCH (Physical Downlink Control Channel).

Hereinafter, the PDCCH will be described in more detail. The PDCCH is allocated in one or more CCEs (Control Channel Elements). The CCE is a unit of a radio resource in which the PDCCH is allocated. In addition, a common search space and a user equipment-specific search space are comprised of the plurality of CCEs.

The common search space is the space common among the plurality of mobile station apparatuses, and is the space where the PDCCH for the plurality of mobile station apparatuses and/or the PDCCH for a specific mobile station apparatus are allocated. The common search space is comprised of a predetermined CCE. The user equipment-specific search space is the space where the PDCCH for the specific mobile station apparatus is allocated, and is the space configured for each mobile station apparatus. As for the common search space and the user equipment-specific search space, different common search space and user equipment-specific search space are configured for each number of the CCEs in which the PDCCH is allocated. Note that a part or all of the common search space and the user equipment-specific search space may overlap with each other, a part or all of the different common search spaces may overlap with each other, a part or all of the different user equipment-specific search spaces for the same mobile station apparatus may overlap with each other, and that a part or all of the user equipment-specific search spaces for the different mobile station apparatuses may overlap with each other.

A plurality of formats is prepared for DCI transmitted by the PDCCH. A format of the DCI is called a DCI format. In the DCI formats, there are included a DCI format with a same bit number (or also referred to as a "payload size") as the other DCI formats, and a DCI format with a different bit number from the other DCI formats. The base station apparatus adds to the DCI a sequence in which a CRC (Cyclic Redundancy Check) code generated based on the DCI is scrambled (or referred to as masked) by RNTI (Radio Network Temporary Identity).

The mobile station apparatus changes an interpretation of the DCI depending on by which RNTI the CRC code is scrambled. Hereinafter, a state where the CRC code scrambled by the RNTI has been added to the DCI will be represented simply as that the RNTI is included in the DCI, or the RNTI is included in the PDCCH. For example, the mobile station apparatus discriminates a type of the DCI format of the DCI from the RNTI included in the DCI.

The base station apparatus encodes the DCI according to the bit number of the CCE, and allocates it in the common search space or the user equipment-specific search space. Note that the base station apparatus performs the same coding of DCI formats with a same bit number, and that performs different coding of DCI formats with different bit numbers. Namely, since a coding scheme which the base station apparatus applies to the DCI format differs depending on the bit number of the DCI format, a decoding method of the DCI format in the mobile station apparatus differs depending on the bit number of the DCI format. Accordingly, the mobile station apparatus can discriminate the type of the DCI format based on a difference of the bit number of the DCI format, or of the decoding method. When the bit number of the DCI format is the same as each other, the mobile station apparatus is made to be able to discriminate the type of the DCI format by using a method for including in the DCI format information for discriminating the type of the DCI format, or for adding a CRC code scrambled by RNTI corresponding to the type of the DCI format, etc.

When the mobile station apparatus performs decoding processing of all the CCE candidates in which the PDCCH is allocated in the common search space and the user equipment-specific search space, further descrambles by the RNTI a sequence in which the CRC code has been scrambled by the RNTI, and detects no error in the descrambled CRC code, it determines to have succeeded in obtaining the PDCCH. This processing is called blind decoding.

In addition, in the 3GPP, has been examined a radio access system and a radio network that achieves higher-speed data communication (hereinafter referred to as "LTE-A (Long Term Evolution-Advanced)" or "A-EUTRA (Advanced Evolved Universal Terrestrial Radio Access)") utilizing a wider frequency band than the LTE. It is required that the LTE-A has backward compatibility with the LTE, i.e., a base station apparatus of the LTE-A simultaneously performs wireless communication with mobile station apparatuses of both the LTE-A and the LTE, and the mobile station apparatus of the LTE-A can perform wireless communication with base station apparatuses of both the LTE-A and the LTE, and it has been examined that a same channel structure as in the LTE is used for the LTE-A.

In the LTE-A, has been examined a technology (frequency band aggregation, also referred to as spectrum aggregation, carrier aggregation, frequency aggregation, etc.) in which a plurality of frequency bands (hereinafter referred to as "CCs (Component Carriers)") with the same channel structure as in the LTE are used as one frequency band (wide frequency band). Specifically, in communication using the frequency band aggregation, a downlink channel is transmitted for each downlink CC, and an uplink channel is transmitted for each uplink CC. Namely, frequency band aggregation is a technology in which a base station apparatus and a plurality of mobile station apparatuses simultaneously transmit and receive a plurality of data information and a plurality of control information using a plurality of carrier components including a plurality of channels in an uplink and a downlink.

CITATION LIST

Non-Patent Document

Non-Patent Document 1: "3GPP TS36.213 v.9.0.1 (2009-12)", 2009-12-18.

DISCLOSURE OF THE INVENTION

Problem to be Solved by the Invention

However, there has been a problem in a conventional technology that a mobile station apparatus cannot identify a type of a DCI format when a common search space and a user equipment-specific search space overlap with each other, i.e., CCE candidates in which PDCCHs of the common search space and the user equipment-specific search space are allocated are comprised of the same number and of the same radio resources, further RNTI included in the PDCCHs is the same as each other, and bit numbers of the DCI formats transmitted in the common search space and the user equipment-specific search space, respectively are the same as each other.

The present invention is made in view of the above-described problem, and an object of the present invention is to provide a wireless communication system in which a mobile station apparatus can identify a type of a DCI format, a base station apparatus, a mobile station apparatus, a wireless communication method, and an integrated circuit in the wireless communication system in which a common search space and a user equipment-specific search space overlap with each other, Means for Solving the Problems (1) In order to achieve the above-described object, the present invention has taken the following measures. Namely, a wireless communication system of the present invention is the wireless communication system comprising a mobile station apparatus and a base station apparatus which transmits control information to the mobile station apparatus, and the wireless communication system is characterized in that when payload sizes of respective control information of a physical downlink control channel candidate of a common search space and a physical downlink control channel candidate of a mobile station control-specific search space, the physical downlink control channel candidates being the candidates in which the control information is allocated, are the same as each other, and the physical downlink control channel candidate of the common search space and the physical downlink control channel candidate of the user equipment-specific search space are comprised of same CCEs, the base station apparatus allocates the control information only in the physical downlink control channel candidate of the common search space and transmits the control information, and the mobile station apparatus performs reception processing of the control information determining that the control information has been transmitted using the physical downlink control channel only in the common search space.

(2) In addition, a wireless communication system of the present invention is characterized in that CRC of the control information is scrambled by C-RNTI.

(3) In addition, a wireless communication system of the present invention is characterized in that the base station apparatus and the mobile station apparatus communicate with each other using a plurality of CCs, and that the control information includes information indicating a CC to which the physical downlink control channel corresponds.

(4) In addition, a wireless communication system of the present invention is characterized in that the base station apparatus and the mobile station apparatus communicate with each other using a plurality of CCs, and that the common search space and the user equipment-specific search space are configured in a same CC.

(5) In addition, a base station apparatus of the present invention is the base station apparatus which transmits control information to a mobile station apparatus, and the base station apparatus is characterized in that when payload sizes of respective control information of a physical downlink control channel candidate of a common search space and a physical downlink control channel candidate of a mobile station control-specific search space, the physical downlink control channel candidates being the candidates in which the control information is allocated, are the same as each other, and the physical downlink control channel candidate of the common search space and the physical downlink control channel candidate of the user equipment-specific search space are comprised of same CCEs, the base station apparatus allocates the control information only in the physical downlink control channel candidate of the common search space and transmits the control information.

(6) In addition, a base station apparatus of the present invention is characterized in that CRC of the control information is scrambled by C-RNTI.

(7) In addition, a base station apparatus of the present invention is characterized in that the base station apparatus communicates with the mobile station apparatus using a plurality of CCs, and that the control information includes information indicating a CC to which the physical downlink control channel corresponds.

(8) In addition, a base station apparatus of the present invention is characterized in that the base station apparatus communicates with the mobile station apparatus using a plurality of CCs, and that the common search space and the user equipment-specific search space are configured in a same CC.

(9) In addition, a mobile station apparatus of the present invention is the mobile station apparatus which receives control information transmitted from a base station apparatus, and the mobile station apparatus is characterized in that when in the base station apparatus, payload sizes of respective control information of a physical downlink control channel candidate of a common search space and a physical downlink control channel candidate of a mobile station control-specific search space, the physical downlink control channel candidates being the candidates in which the control information is allocated, are the same as each other, and the physical downlink control channel candidate of the common search space and the physical downlink control channel candidate of the user equipment-specific search space are comprised of same CCEs, the mobile station apparatus performs reception processing of the control information determining that the control information has been transmitted using the physical downlink control channel only in the common search space.

(10) In addition, it is characterized in that CRC of the control information is scrambled by C-RNTI.

(11) In addition, a mobile station apparatus of the present invention is characterized in that the mobile station apparatus communicates with the base station apparatus using a plurality of CCs, and that the control information includes information indicating a CC to which the physical downlink control channel corresponds.

(12) In addition, a mobile station apparatus of the present invention is characterized in that the mobile station apparatus communicates with the base station apparatus using a plurality of CCs, and that the common search space and the user equipment-specific search space are configured in a same CC.

(13) In addition, a wireless communication method of the present invention is the wireless communication method used for a base station apparatus which transmits control information to a mobile station apparatus, and the wireless communication method is characterized in that when payload sizes of respective control information of a physical downlink control channel candidate of a common search space and a physical downlink control channel candidate of a mobile station control-specific search space, the physical downlink control channel candidates being the candidates in which the control information is allocated, are the same as each other, and the physical downlink control channel candidate of the common search space and the physical downlink control channel candidate of the user equipment-specific search space are comprised of same CCEs, the base station apparatus allocates the control information only in the physical downlink control channel candidate of the common search space and transmits the control information.

(14) In addition, a wireless communication method of the present invention is characterized in that CRC of the control information is scrambled by C-RNTI.

(15) In addition, a wireless communication method of the present invention is characterized in that the base station apparatus communicates with the mobile station apparatus using a plurality of CCs, and that the control information includes information indicating a CC to which the physical downlink control channel corresponds.

(16) In addition, a wireless communication method of the present invention is characterized in that the base station apparatus communicates with the mobile station apparatus using a plurality of CCs, and that the common search space and the user equipment-specific search space are configured in a same CC.

(17) In addition, a wireless communication method of the present invention is the wireless communication method used for a mobile station apparatus which receives control information transmitted from a base station apparatus, and the wireless communication method is characterized in that when in the base station apparatus, payload sizes of respective control information of a physical downlink control channel candidate of a common search space and a physical downlink control channel candidate of a mobile station control-specific search space, the physical downlink control channel candidates being the candidates in which the control information is allocated, are the same as each other, and the physical downlink control channel candidate of the common search space and the physical downlink control channel candidate of the user equipment-specific search space are comprised of same CCEs, the mobile station apparatus performs reception processing of the control information determining that the control information has been transmitted using the physical downlink control channel only in the common search space.

(18) In addition, a wireless communication method of the present invention is characterized in that CRC of the control information is scrambled by C-RNTI.

(19) In addition, a wireless communication method of the present invention is characterized in that the mobile station apparatus communicates with the base station apparatus using a plurality of CCs, and that the control information includes information indicating a CC to which the physical downlink control channel corresponds.

(20) In addition, a wireless communication method of the present invention is characterized in that the mobile station apparatus communicates with the base station apparatus using a plurality of CCs, and that the common search space and the user equipment-specific search space are configured in a same CC.

(21) In addition, an integrated circuit of the present invention is the integrated circuit used for a base station apparatus which transmits control information to a mobile station apparatus, and the integrated circuit is characterized in that when payload sizes of respective control information of a physical downlink control channel candidate of a common search space and a physical downlink control channel candidate of a mobile station control-specific search space, the physical downlink control channel candidates being the candidates in which the control information is allocated, are the same as each other, and the physical downlink control channel candidate of the common search space and the physical downlink control channel candidate of the user equipment-specific search space are comprised of same CCEs, the base station apparatus allocates the control information only in the physical downlink control channel candidate of the common search space and transmits the control information.

(22) In addition, an integrated circuit of the present invention is characterized in that CRC of the control information is scrambled by C-RNTI.

(23) In addition, an integrated circuit of the present invention is characterized in that the base station apparatus communicates with the mobile station apparatus using a plurality of CCs, and that the control information includes information indicating a CC to which the physical downlink control channel corresponds.

(24) In addition, an integrated circuit of the present invention is characterized in that the base station apparatus communicates with the mobile station apparatus using a plurality of CCs, and that the common search space and the user equipment-specific search space are configured in a same CC.

(25) In addition, an integrated circuit of the present invention is the integrated circuit used for a mobile station apparatus which receives control information transmitted from a base station apparatus, and the integrated circuit is characterized in that when in the base station apparatus, payload sizes of respective control information of a physical downlink control channel candidate of a common search space and a physical downlink control channel candidate of a mobile station control-specific search space, the physical downlink control channel candidates being the candidates in which the control information is allocated, are the same as each other, and the physical downlink control channel candidate of the common search space and the physical downlink control channel candidate of the user equipment-specific search space are comprised of same CCEs, the mobile station apparatus performs reception processing of the control information determining that the control information has been transmitted using the physical downlink control channel only in the common search space.

(26) In addition, an integrated circuit of the present invention is characterized in that CRC of the control information is scrambled by C-RNTI.

(27) In addition, an integrated circuit of the present invention is characterized in that the mobile station apparatus communicates with the base station apparatus using a plurality of CCs, and that the control information includes information indicating a CC to which the physical downlink control channel corresponds.

(28) In addition, an integrated circuit of the present invention is characterized in that the mobile station apparatus communicates with the base station apparatus using a plurality of CCs, and that the common search space and the user equipment-specific search space are configured in a same CC.

(29) In addition, a wireless communication system of the present invention is the wireless communication system comprising a mobile station apparatus and a base station apparatus which transmits control information to the mobile station apparatus, and the wireless communication system is characterized in that when an information bit number of a first format which is the format of the control information and which includes information indicating a CC is a predetermined bit number, the base station apparatus inserts at least 1 bit in the first format to decide a first payload size, and transmits the first format of the first payload size to the mobile station apparatus, and the mobile station apparatus performs reception processing of the first format determining that the first format is the first payload size.

(30) In addition, a base station apparatus of the present invention is the base station apparatus which transmits control information to a mobile station apparatus, and the base station apparatus is characterized in that when an information bit number of a first format which is the format of the control information and which includes information indicating a CC is a predetermined bit number, the base station apparatus inserts at least 1 bit in the first format to decide a first payload size, and transmits the first format of the first payload size to the mobile station apparatus.

(31) In addition, a mobile station apparatus of the present invention is the mobile station apparatus which receives control information transmitted from a base station apparatus, and the mobile station apparatus is characterized in that the mobile station apparatus receives a first format determining that the first format which is the format of the control information and which includes information indicating a CC is a first payload size decided by the base station apparatus inserting at least 1 bit in the first format.

(32) In addition, a wireless communication method of the present invention is the wireless communication method used for a base station apparatus which transmits control information to a mobile station apparatus, and the wireless communication method is characterized by comprising the steps of: inserting at least 1 bit in a first format to decide a first payload size; and transmitting the first format of the first payload size to the mobile station apparatus when an information bit number of the first format which is the format of the control information and which includes information indicating a CC is a predetermined bit number.

(33) In addition, a wireless communication method of the present invention is the wireless communication method used for a mobile station apparatus which receives control information transmitted from a base station apparatus, and the wireless communication method is characterized by comprising a step of receiving a first format determining that the first format which is the format of the control information and which includes information indicating a CC is a first payload size decided by the base station apparatus inserting at least 1 bit in the first format.

(34) In addition, an integrated circuit of the present invention is the integrated circuit used for a base station apparatus which transmits control information to a mobile station apparatus, and the integrated circuit is characterized by comprising: a function for inserting at least 1 bit in a first format to decide a first payload size; and a function for transmitting the first format of the first payload size to the mobile station apparatus when an information bit number of the first format which is the format of the control information and which includes information indicating a CC is a predetermined bit number.

(35) In addition, an integrated circuit of the present invention is the integrated circuit used for a mobile station apparatus which receives control information transmitted from a base station apparatus, and the integrated circuit is characterized by comprising a function for receiving a first format determining that the first format which is the format of the control information and which includes information indicating a CC is a first payload size decided by the base station apparatus inserting at least 1 bit in the first format.

(36) In addition, a wireless communication system of the present invention is the wireless communication system comprising a mobile station apparatus and a base station apparatus which transmits control information to the mobile station apparatus, and the wireless communication system is characterized in that the base station apparatus and the mobile station apparatus configure a common search space from a predetermined CCE, configure a user equipment-specific search space in which the number of CCEs configuring a PDCCH candidate is the same as that of the common search space from the CCEs excluding the CCEs used for the common search space, and that configure from all the CCEs a user equipment-specific search space in which the number of CCEs configuring the PDCCH candidate is different from that of the common search space.

(37) In addition, a base station apparatus of the present invention is the base station apparatus which transmits control information to a mobile station apparatus, and the base station apparatus is characterized in that the base station apparatus configures a common search space from a predetermined CCE, configures a user equipment-specific search space in which the number of CCEs configuring a PDCCH candidate is the same as that of the common search space from the CCEs excluding the CCEs used for the common search space, and that configure from all the CCEs a user equipment-specific search space in which the number of CCEs configuring the PDCCH candidate is different from that of the common search space.

(38) In addition, a mobile station apparatus of the present invention is the mobile station apparatus which receives control information transmitted from a base station apparatus, and the mobile station apparatus is characterized in that the mobile station apparatus configures a common search space from a predetermined CCE, configures a user equipment-specific search space in which the number of CCEs configuring a PDCCH candidate is the same as that of the common search space from the CCEs excluding the CCEs used for the common search space, and that configures from all the CCEs a user equipment-specific search space in which the number of CCEs configuring the PDCCH candidate is different from that of the common search space.

(39) In addition, a wireless communication method of the present invention is the wireless communication method used for a base station apparatus which transmits control information to a mobile station apparatus, and the wireless communication method is characterized by comprising the steps of: configuring a common search space from a predetermined CCE; configuring a user equipment-specific search space in which the number of CCEs configuring a PDCCH candidate is the same as that of the common search space from the CCEs excluding the CCEs used for the common search space; and configuring from all the CCEs a user equipment-specific search space in which the number of CCEs configuring the PDCCH candidate is different from that of the common search space.

(40) In addition, a wireless communication method of the present invention is the wireless communication method used for a mobile station apparatus which receives control information transmitted from a base station apparatus, and the wireless communication method is characterized by comprising the steps of: configuring a common search space from a predetermined CCE; configuring a user equipment-specific search space in which the number of CCEs configuring a PDCCH candidate is the same as that of the common search space from the CCEs excluding the CCEs used for the common search space; and configuring from all the CCEs a user equipment-specific search space in which the number of CCEs configuring the PDCCH candidate is different from that of the common search space.

(41) In addition, an integrated circuit of the present invention is the integrated circuit used for a base station apparatus which transmits control information to a mobile station apparatus, and the integrated circuit is characterized by comprising: a function for configuring a common search space from a predetermined CCE; a function for configuring a user equipment-specific search space in which the number of CCEs configuring a PDCCH candidate is the same as that of the common search space from the CCEs excluding the CCEs used for the common search space; and a function for configuring from all the CCEs a user equipment-specific search space in which the number of CCEs configuring the PDCCH candidate is different from that of the common search space.

(42) In addition, an integrated circuit of the present invention is the integrated circuit used for a mobile station apparatus which receives control information transmitted from a base station apparatus, and the integrated circuit is characterized by comprising: a function for configuring a common search space from a predetermined CCE; a function for configuring a user equipment-specific search space in which the number of CCEs configuring a PDCCH candidate is the same as that of the common search space from the CCEs excluding the CCEs used for the common search space; and a function for configuring from all the CCEs a user equipment-specific search space in which the number of CCEs configuring the PDCCH candidate is different from that of the common search space.

Advantage of the Invention

According to the invention, a mobile station apparatus can identify a type of a DCI format.

BRIEF DESCRIPTION OF THE DRAWINGS

FIG. 8 is a schematic block diagram showing a configuration of the mobile station apparatus 1 of the present invention; and FIG. 9 is a schematic diagram showing one example of a search space according to a third embodiment of the present invention.

BEST MODES FOR CARRYING OUT THE INVENTION (First embodiment)

Hereinafter, a first embodiment of the present invention will be described in detail with reference to drawings.

Figure 1:
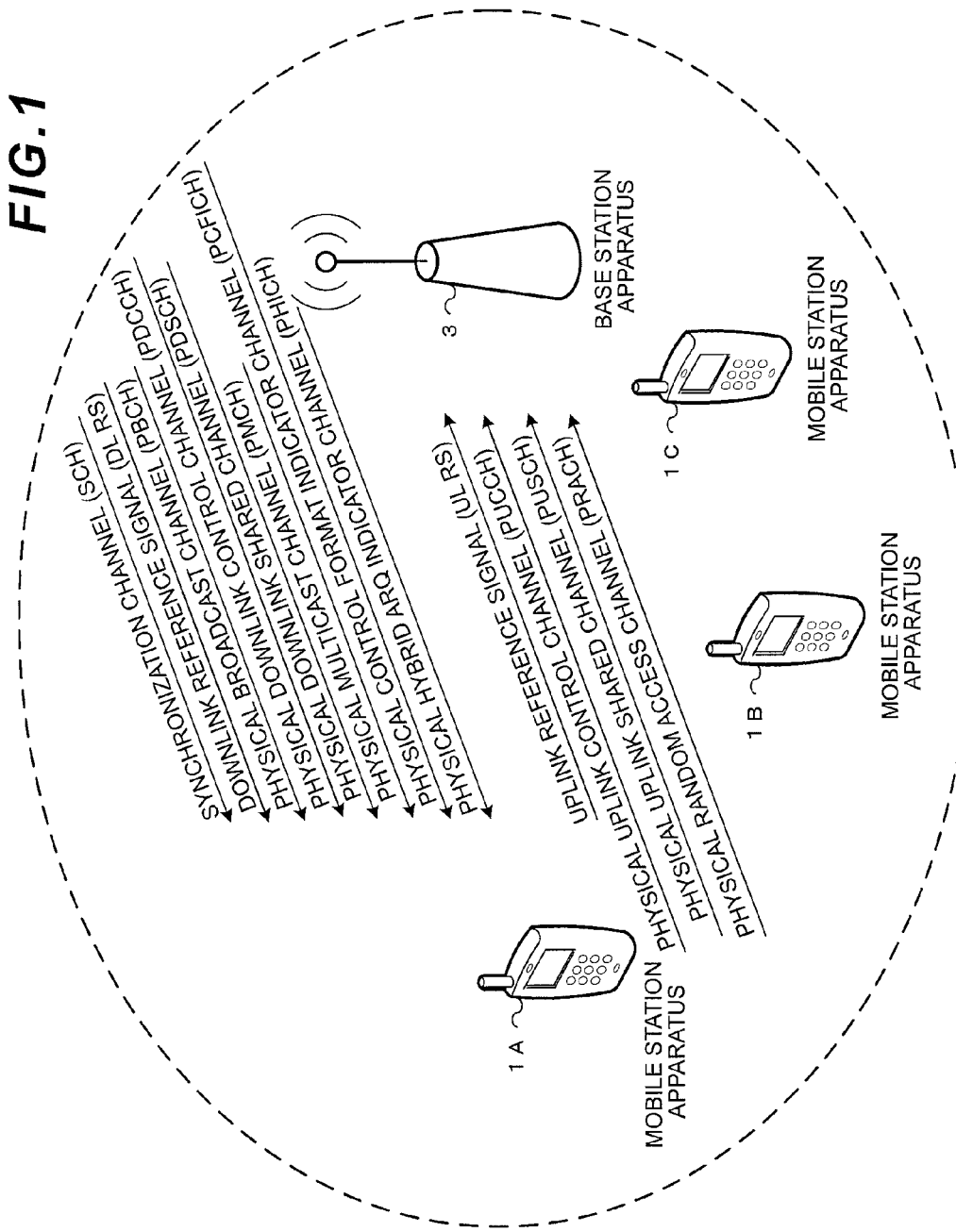
FIG. 1 is a conceptual illustration of a wireless communication system according to a first embodiment of the present invention.

FIG. 1 is a conceptual illustration of a wireless communication system according to a first embodiment of the present invention. In FIG. 1, the wireless communication system comprises mobile station apparatuses 1A to 1C and a base station apparatus 3. FIG. 1 shows that in wireless communication from the base station apparatus 3 to mobile station apparatuses 1A to 1C (downlink), assigned are an SCH (Synchronization Channel), a downlink pilot channel (or, also referred to as a "DL RS (Downlink Reference Signal)"), a PBCH (Physical Broadcast Channel), a PDCCH (Physical Downlink Control Channel), a PDSCH (Physical Downlink Shared Channel), a PMCH (Physical Multicast Channel), a PCFICH (Physical Control Format Indicator Channel), and a PHICH (Physical Hybrid ARQ Indicator Channel).

In addition, FIG. 1 shows that in wireless communication from the mobile station apparatuses 1A to 1C to the base station apparatus 3 (uplink), assigned are an uplink pilot channel (or, also referred to as an "UL RS (Uplink Reference Signal)"), a PUCCH (Physical Uplink Control Channel), a PUSCH (Physical Uplink Shared Channel), a PRACH (Physical Random Access Channel). Hereinafter, the mobile station apparatuses 1A to 1C are referred to as a mobile station apparatus 1.

Figure 2:
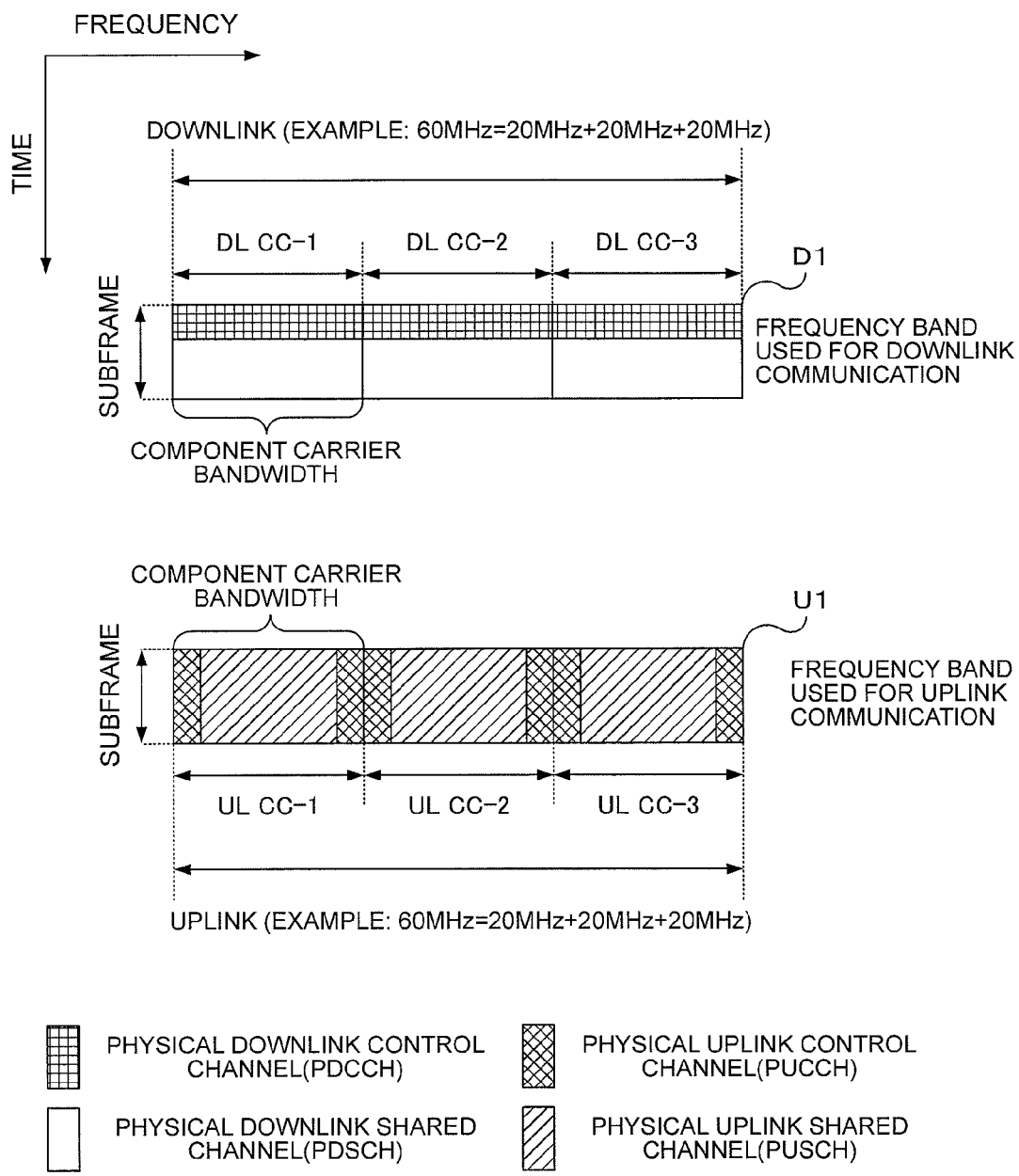
FIG. 2 is a diagram showing one example of frequency band aggregation processing of the present invention.

FIG. 2 is a diagram showing one example of frequency band aggregation processing of the present invention. In FIG. 2, a horizontal axis indicates a frequency domain and a vertical axis indicates a time domain. As shown in FIG. 2, a downlink subframe D1 is comprised of subframes of three downlink CCs (a DL CC-1 (Downlink Component Carrier-1), a DL CC-2, and a DL CC-3) each having a bandwidth of 20 MHz. To each of the subframes of the downlink CCs, time-multiplexed are a space which is indicated by a space hatched with lattice-shaped lines and in which a PDCCH is allocated, and a space which is indicated by a space without hatching and in which a PDSCH is allocated. For example, the base station apparatus 3 allocates a signal in the PUSCHs of one or more downlink CCs of the three downlink CCs in a certain downlink subframe, and transmits the signal to the mobile station apparatus 1.

Meanwhile, an uplink subframe U1 is comprised of three uplink CCs (a UL CC-1 (Uplink Component Carrier-1), a UL CC-2, and a UL CC-3) each having a bandwidth of 20 MHz.

To each of the subframes of the uplink CCs, frequency-multiplexed are a space which is indicated by a space hatched with oblique lattice-shaped lines and in which a PUCCH is allocated, and a space which is indicated by a space hatched with rising oblique lines from bottom left to top right and in which a PUSCH is allocated. For example, the mobile station apparatus 1 allocates a signal in the PUSCHs of one or more uplink CCs of the three uplink CCs in a certain uplink subframe, and transmits the signal to the base station apparatus 3.

Figure 3:
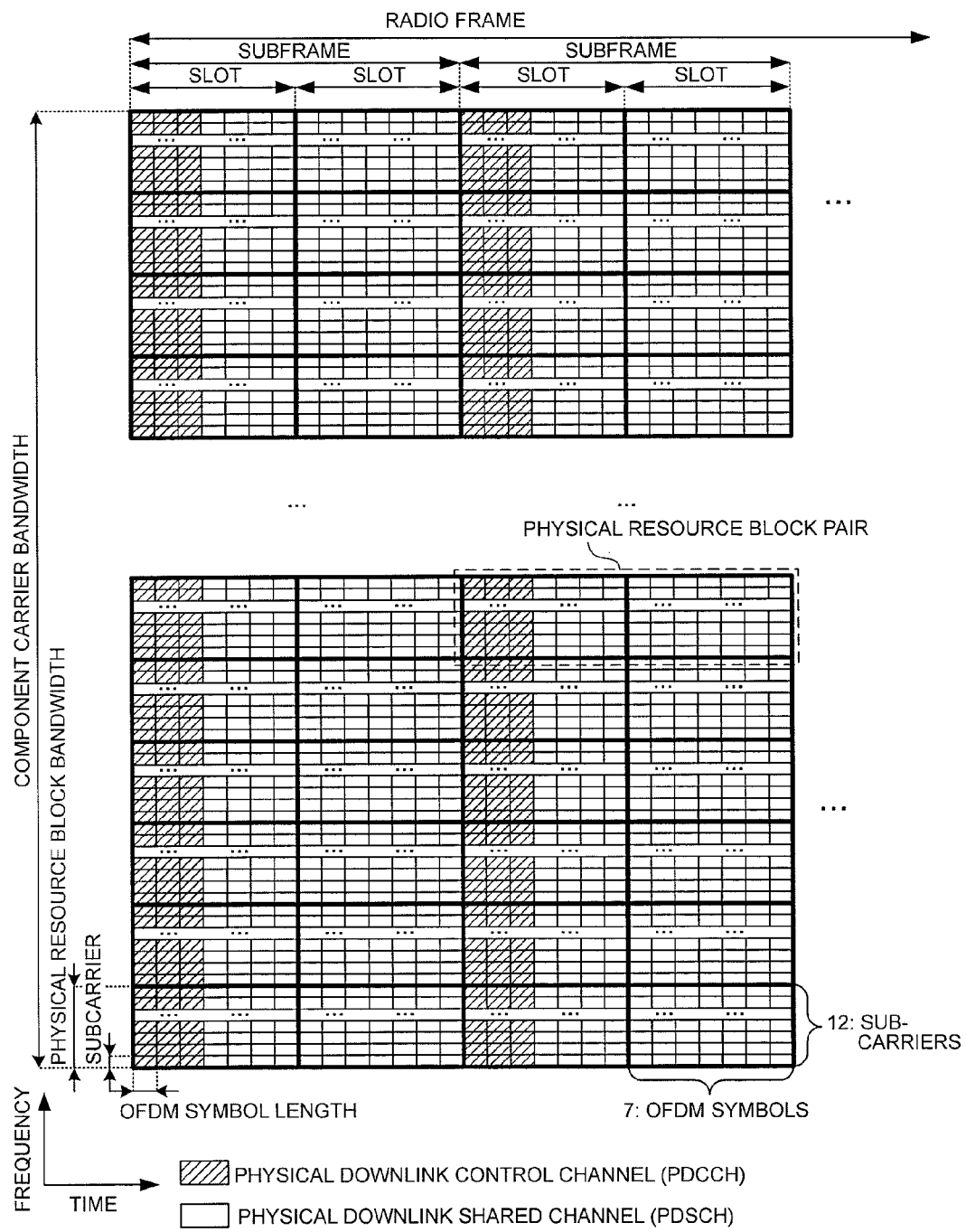
FIG. 3 is a schematic diagram showing one example of a configuration of a downlink radio frame of the present invention.

FIG. 3 is a schematic diagram showing one example of a configuration of a downlink radio frame of the present invention. FIG. 3 shows the configuration of the radio frame in a certain downlink CC. In FIG. 3, a horizontal axis indicates a time domain and a vertical axis indicates a frequency domain. As shown in FIG. 3, the radio frame of the downlink CC is comprised of a plurality of downlink PRB (Physical Resource Block) pairs (for example, a space surrounded with a dashed line in FIG. 3). This downlink PRB pair is a unit of radio resource assignment, etc., and is comprised of a frequency band (PRB bandwidth; 180 kHz) with a predetermined width and a time zone (two slots are equal to one subframe; 1 ms).

One downlink PRB pair is comprised of two downlink PRBs (PRB bandwidth×a slot) contiguous in the time domain. One downlink PRB (a unit surrounded with a thick line in FIG. 3) is comprised of twelve subcarriers (15 kHz) in the frequency domain, and is comprised of seven OFDM (Orthogonal Frequency Division Multiplexing) symbols (71 μs) in the time domain.

In the time domain, there exists a slot (0.5 ms) comprised of the seven OFDM symbols (71 μs), a subframe (1 ms) comprised of two slots, and a radio frame (10 ms) comprised of ten subframes. In the frequency domain, the plurality of downlink PRBs is allocated according to a bandwidth of the downlink CC. Note that a unit comprised of one subcarrier and one OFDM symbol is referred to as a downlink resource element.

Hereinafter, a channel which is assigned in the downlink radio frame will be described. In each downlink subframe, for example, a PDCCH, a PDSCH, and a DL RS are assigned. First, the PDCCH will be described. The PDCCH is first allocated in OFDM symbols of a head of a subframe (space hatched with the rising oblique lines from bottom left to top right in FIG. 3). Note that the number of OFDM symbols in which the PDCCH is allocated is one to three, and differs for each subframe. In the PDCCH, allocated is a signal of DCI (Downlink Control Information) which is comprised of information formats, such as downlink assignment (also referred to as downlink grant) and uplink grant, and which is information used for controlling communication.

The downlink assignment is comprised of information indicating a modulation scheme for the PDSCH, information indicating a coding scheme, information indicating radio resource assignment, information regarding a HARQ (Hybrid Automatic Repeat Request), a TPC command, etc. In addition, the uplink grant is comprised of information indicating a modulation scheme for the PUSCH, information indicating a coding scheme, information indicating radio resource assignment, information regarding a HARQ, a TPC command, etc. Note that the HARQ is a technology in which for example, when the mobile station apparatus 1 (base station apparatus 3) transmits success or failure (ACK/NACK (Acknowledgement/Negative Acknowledgement)) of decoding of data information to the base station apparatus 3 (mobile station apparatus 1), and the mobile station apparatus 1 (base station apparatus 3) cannot decode data information due to an error (NACK), the base station apparatus 3 (mobile station apparatus 1) retransmits a signal, and the mobile station apparatus 1 (base station apparatus 3) performs decoding processing with respect to a composite signal of the signal received again and the already received signal.

Next, the PDSCH will be described. The PDSCH is allocated in OFDM symbols (space without hatching in FIG. 2) other than the OFDM symbols in which the PDCCH is allocated in the subframe. A signal of data information (Transport Block) is allocated in the PDSCH. A radio resource of the PDSCH is assigned using downlink assignment. The radio resource of the PDSCH is allocated in a same downlink subframe as the PDCCH including the downlink assignment having used for assignment of the PDSCH in the time domain, and is allocated in a same downlink CC and a different downlink CC as/from the PDCCH including the downlink assignment having used for assignment of the PDSCH in the frequency domain.

In the PDCCH, included is information (hereinafter referred to as a "carrier indicator") indicating to which PDSCH transmitted by a downlink CC the downlink assignment corresponds, or to which PUSCH transmitted by an uplink CC the uplink assignment corresponds. When the carrier indicator is not included in the downlink assignment, the downlink assignment corresponds to a PDSCH of the same downlink CC in which the downlink assignment has been transmitted. When the carrier indicator is not included in the uplink grant, the uplink grant corresponds to a PUSCH of an uplink CC linked to the same downlink CC in which the uplink grant has been transmitted. Although an illustration of a DL RS is omitted in FIG. 2 for simplifying a description, the DL RS is distributedly allocated in the frequency domain and the time domain.

Hereinafter, the PDCCH will be described in more detail. The PDCCH is allocated in one or more CCEs (Control Channel Elements). The CCE is comprised of a plurality of downlink resource elements which are distributed in the frequency domain and the time domain within the space (space hatched with the rising oblique lines from bottom left to top right in FIG. 3) in which the PDCCH is allocated. In addition, a common search space and a user equipment specific-search space are comprised of the plurality of CCEs.

Figure 4:
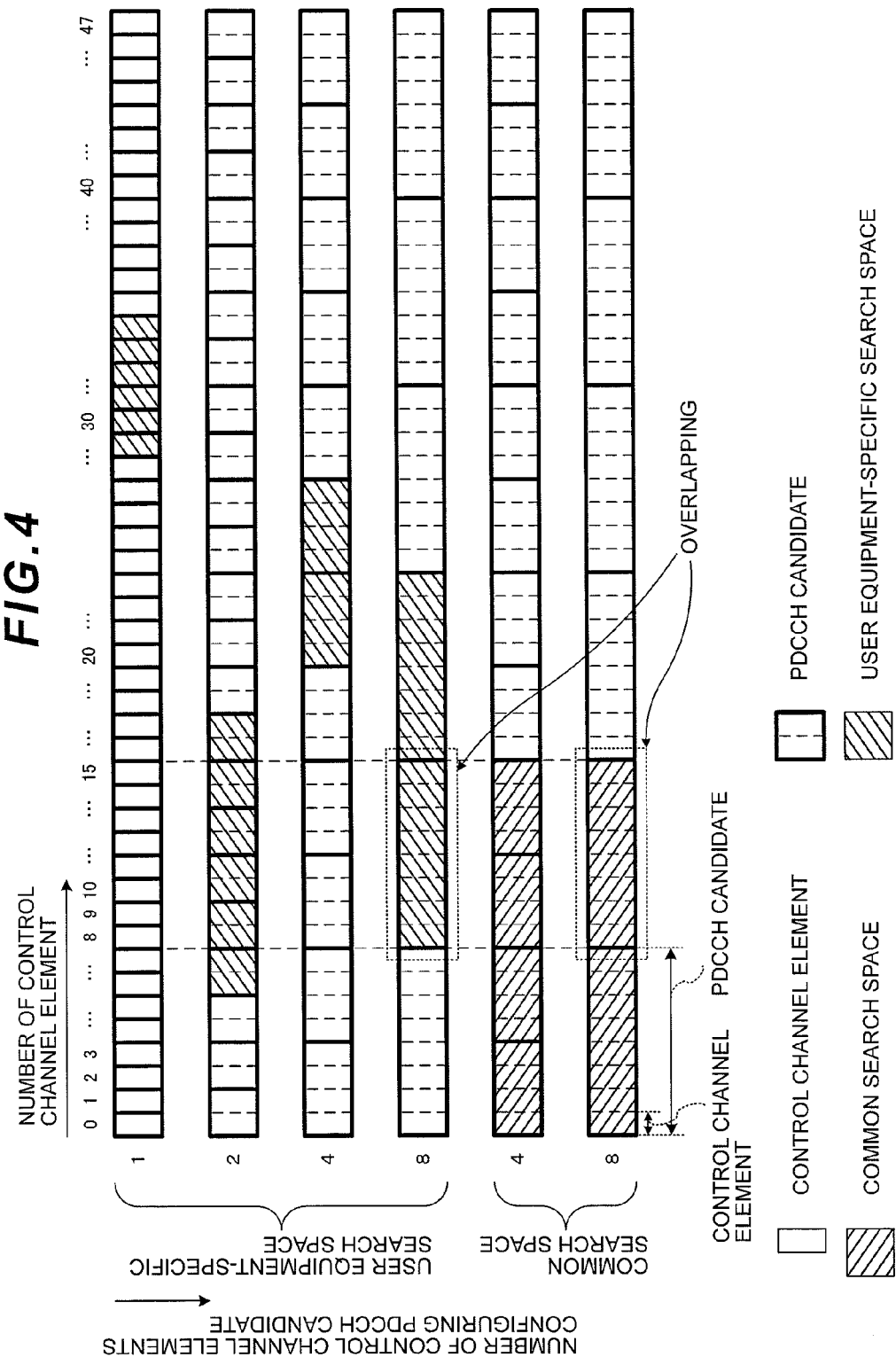
FIG. 4 is a schematic diagram showing one example of a search space of the present invention.

FIG. 4 is a schematic diagram showing one example of a search space of the present invention. In FIG. 4, a horizontal axis indicates the number to identify a CCE. A unit surrounded by a thick line in FIG. 4 is a candidate (hereinafter referred to as a "PDCCH candidate") which is comprised of a plurality of contiguous number of CCEs, and in which the PDCCH is allocated, a PDCCH candidate hatched by rising oblique lines from bottom left to top right in FIG. 4 is the PDCCH candidate for the user equipment-specific search space, and a PDCCH candidate hatched by falling oblique lines from top left to bottom right in FIG. 4 is the PDCCH candidate for the common search space.

The common search space is the space common between the plurality of mobile station apparatuses 1, and is the space where the PDCCH for the plurality of mobile station apparatuses 1 and/or the PDCCH for a specific mobile station apparatus 1 is allocated. In addition, the common search space is comprised of predetermined CCEs, and the common search space is comprised of CCEs of No. 0 to No. 15 in FIG. 4. The user equipment-specific search space is the space where the PDCCH for the specific mobile station apparatus 1 is allocated, and is the space configured for each mobile station apparatus 1.

The common search space and the user equipment-specific search space differ for each number of CCEs which configure the PDCCH candidates. In FIG. 4, there are four different user equipment-specific search spaces for a PDCCH candidate comprised of one CCE, a PDCCH candidate comprised of two CCEs, a PDCCH candidate comprised of four CCEs, a PDCCH candidate comprised of eight CCEs, and there are two different common search spaces for a PDCCH candidate comprised of four CCEs, and a PDCCH candidate comprised of eight CCEs.

Note that a part of the CCEs, or a part or all of the PDCCH candidates which configure the common search space and the user equipment-specific search space may overlap with each other, a part or all of the different common search spaces may overlap with each other, a part or all of the different user equipment-specific search spaces for the same mobile station apparatus 1 may overlap with each other, and that a part or all of the user equipment-specific search spaces for the different mobile station apparatuses 1 may overlap with each other.

Note that the base station apparatus 3 configures a common search space for each downlink CC. In addition, the base station apparatus 3 may allocate one or more downlink CCs which monitor the common search space for each mobile station apparatus 1 to inform the mobile station apparatus 1 of the assigned downlink CCs. Note that the base station apparatus 3 may allocate one or more downlink CCs which configure the user equipment-specific search space for each mobile station apparatus 1 to inform the mobile station apparatus 1 of the assigned downlink CCs.

A plurality of formats is prepared for the DCI, such as downlink grant and uplink grant. A format of the DCI is called a DCI format. For example, for a DCI format of the uplink grant, prepared are a DCI format 0 used when the mobile station apparatus 1 transmits a PUSCH through one transmission antenna port, a DCI format 0A used when the mobile station apparatus 1 transmits the PUSCH by MIMO (Multiple Input Multiple Output) SM (Spatial Multiplexing), etc.

In addition, for a DCI format of the downlink grant, prepared are a DCI format 1 used when the base station apparatus 3 transmits the PDSCH through one transmission antenna port or the plurality of transmission antenna ports using a transmission diversity scheme and a DCI format 1A with fewer bit numbers than the DCI format 1 (DCI format including information regarding one transport block) and a DCI format 1C with much fewer bit numbers than the DCI format 1A, the DCI format 1C being used for radio resource assignment, such as paging information, a DCI format 2 used when the base station apparatus 3 transmits the PDSCH by MIMO SM (a DCI format including information regarding one or more transport blocks), etc. Bit numbers of the DCI format 1 and the DCI format 1A and the DCI format 1C, and the DCI format 2 change depending on the number of PRBs included in a downlink CC to which each DCI format corresponds, and bit numbers of the DCI format 0 and the DCI format 0A change depending on the number of PRBs included in the uplink CC to which each DCI format corresponds.

Sizes of the two DCI format 0 and DCI format 1A are made to be the same ones by inserting a bit in the format with smaller bit numbers, and flags for identifying the format is included in the formats. A format obtained by inserting the bit to make the bit sizes of the DCI format 0 and the DCI format 1A same is called a DCI format 0/1A.

The DCI format 1C can be allocated only in the common search space. The DCI format 0/1A not including a carrier indicator can be allocated in both the common search space and the user equipment-specific search space. The DCI format 0/1A including the carrier indicator can be allocated only in the user equipment-specific search space. The DCI format 0A and the DCI format 2 can be allocated only in the user equipment-specific search space in both cases of not including and including the carrier indicator.

Figure 5:
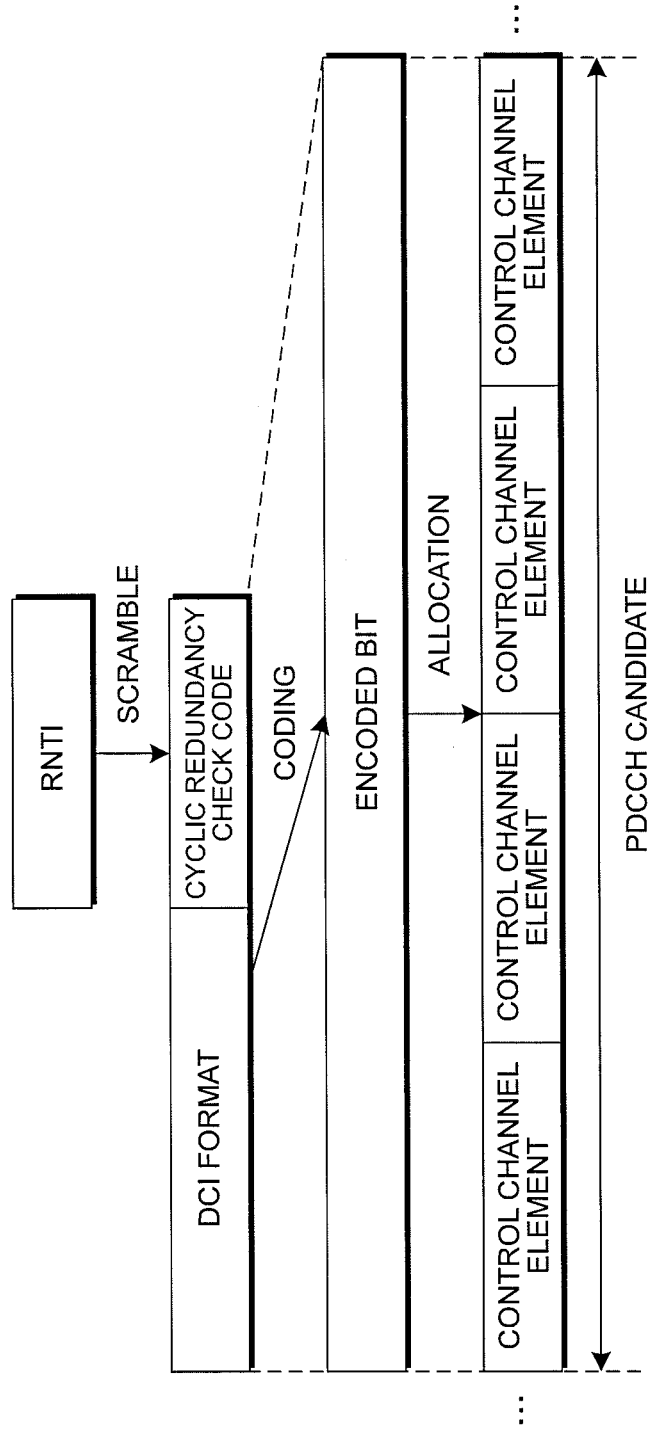
FIG. 5 is a schematic diagram showing a coding method and an allocation method of DCI of the present invention.

FIG. 5 is a schematic diagram showing a coding method and an allocation method of DCI of the present invention. First, the base station apparatus 3 adds to the DCI a sequence in which a CRC (Cyclic Redundancy Check) code generated based on the DCI is scrambled by RNTI (Radio Network Temporary Identity). The mobile station apparatus 1 changes an interpretation of the DCI depending on with which RNTI the CRC code is scrambled. For example, when the CRC code is scrambled by C-RNTI (Cell-Radio Network Temporary Identity) assigned to the mobile station apparatus 1 itself from the base station apparatus 3, the mobile station apparatus 1 determines that the DCI is the information indicating a radio resource addressed to the mobile station apparatus 1 itself. Hereinafter, a state where the CRC code scrambled with the RNTI has been added to the DCI will be represented simply as that the RNTI is included in the DCI, or the RNTI is included in the PDCCH.

Next, the base station apparatus 3 encodes the DCI according to the bit number of a PDCCH candidate in which the encoded DCI is allocated, and allocates the encoded DCI in a PDCCH candidate of the common search space or the user equipment-specific search space. Note that the base station apparatus 3 performs the same coding of DCI formats of the same bit number, and that performs different coding of DCI formats of the different bit numbers. Namely, since a coding scheme applied to a DCI format by the base station apparatus 3 differs depending on a bit number (or, also referred to as a "payload size") of the DCI format, a decoding method of the DCI format in the mobile station apparatus 1 differs depending on the bit number of the DCI format. Accordingly, the mobile station apparatus 1 can discriminate a type of the DCI format by a difference of the bit number of the DCI format, or of the decoding method. When the bit number of the DCI format is the same as each other, the mobile station apparatus 1 is made to discriminate the type of the DCI format using a method for including in the DCI format information for discriminating the type thereof, or a method for adding a CRC code scrambled by RNTI corresponding to the type of the DCI format.

When the mobile station apparatus 1 performs decoding processing of all the candidates in which the PDCCH is allocated in the common search space and the user equipment-specific search space, further descrambles by RNTI a sequence in which a CRC code has been scrambled by the RNTI, and detects to have no error in the descrambled CRC code, it determines to have succeeded in obtaining the PDCCH. This processing is called blind decoding.

The base station apparatus 3 allocates in the common search space a PDCCH including P-RNTI (Paging-Radio Network Temporary Identity) used for scheduling of paging information and update information of system information, and a PDCCH including SI-RNTI (System Information-Radio Network Temporary Identity) used for scheduling of the system information, and a PDCCH including RA-RNTI (Random Access-Radio Network Temporary Identity) used for scheduling of a random access response, and the mobile station apparatus 1 performs blind decoding of the PDCCH including the P-RNTI, the PDCCH including the SI-RNTI, and the PDCCH including the RA-RNTI in the common search space. The P-RNTI, the SI-RNTI, and the RA-RNTI are included only in the DCI format 1C and the DCI format 1A.

The base station apparatus 3 allocates the PDCCH including the C-RNTI in the common search space or in the user equipment-specific search space of the mobile station apparatus 1 to which the base station apparatus 3 has assigned the C-RNTI, and the mobile station apparatus 1 performs blind decoding of the PDCCH including the C-RNTI in the common search space and the user equipment-specific search space. Specifically, the base station apparatus 3 allocates a DCI format 0/1A including C-RNTI and not including a carrier indicator in the common search space or in the user equipment-specific search space of the mobile station apparatus 1 to which the base station apparatus 3 has assigned the C-RNTI, and allocates a DCI format 0/1A including C-RNTI and including a carrier indicator, and a DCI format 0A including the C-RNTI, and a DCI format 2 including the C-RNTI in the user equipment-specific search space of the mobile station apparatus 1 to which the base station apparatus 3 has assigned the C-RNTI.

Note that the base station apparatus 3 can indicate, to each mobile station apparatus 1, for each downlink CC a type of the DCI format to which the mobile station apparatus 1 performs blind decoding, and whether or not the carrier indicator is included in the DCI format allocated in the user equipment-specific search space.

Figure 6:
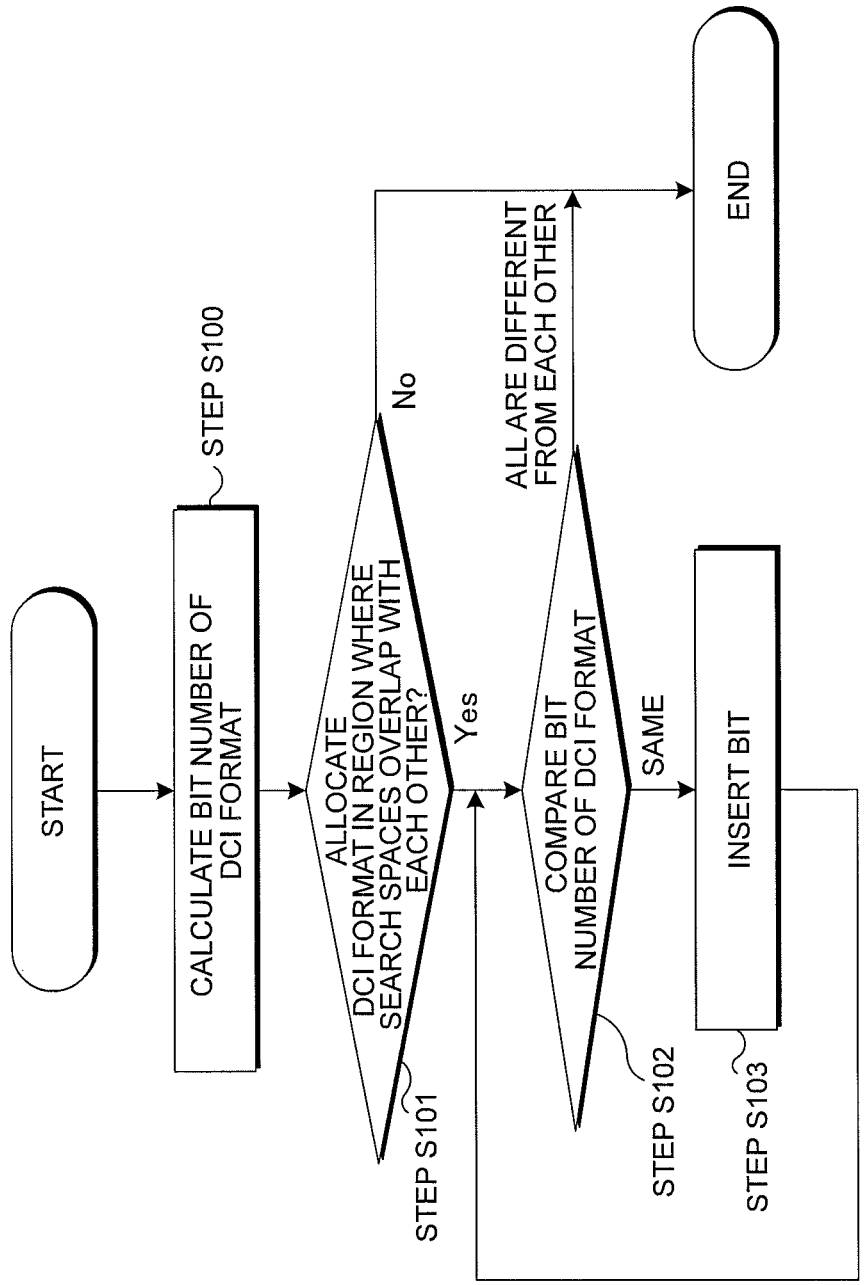
FIG. 6 is a flowchart showing one example of operations of a mobile station apparatus 1 and a base station apparatus 3 of the present invention.

FIG. 6 is a flow chart showing one example of operations of the mobile station apparatus 1 and the base station apparatus 3 of the present invention. FIG. 6 is the flow chart for illustrating a method for calculating a bit number of a DCI format, and the mobile station apparatus 1 and the base station apparatus 3 calculate the bit number of the DCI format with the same method. When processing is started, the mobile station apparatus 1 and the base station apparatus 3 calculate bit numbers of a field indicating radio resource assignment of a DCI format, etc. based on a number of PRBs included in a downlink CC, a number of PRBs included in an uplink CC, whether or not a carrier indicator is included in the DCI format, etc., and they calculate a bit number of a DCI format indicating radio resource assignment of a PDSCH or a PUSCH (step S100).

The mobile station apparatus 1 and the base station apparatus 3 determine whether or not the DCI format is allocated in a space where the common search space and the user equipment-specific search space overlap with each other (step S101). Note that overlapping of the common search space and the user equipment-specific search space means that PDCCH candidates comprised of the same number of CCEs are included in both the common search space and the user equipment-specific search space as a PDCCH candidate comprised of the CCEs of No. 8 to No. 15 in FIG. 4. When the DCI format is not allocated in the space where the common search space and the user equipment-specific search space overlap with each other in step S101, the mobile station apparatus 1 and the base station apparatus 3 complete processing regarding calculation of the bit number of the DCI format.

When the DCI format is allocated in the space where the common search space and the user equipment-specific search space overlap with each other in step S101, the mobile station apparatus 1 and the base station apparatus 3 compare the bit numbers of the respective DCI formats calculated in step S100 (step S102). When all the bit numbers of the respective DCI formats calculated in step S100 are different from each other in step S102, the mobile station apparatus 1 and the base station apparatus 3 complete processing regarding calculation of the bit number of the DCI format. Namely, even for the same DCI format, the mobile station apparatus 1 and the base station apparatus 3 switch whether to insert a bit depending on whether the DCI format is allocated in the space where the common search space and the user equipment-specific search space overlap with each other, or whether it is allocated in a space where the common search space and the user equipment-specific search space do not overlap with each other.

When the bit numbers of the respective DCI formats calculated in step S100 are the same as each other, and there is a DCI format to be allocated in the space where the common search space and the user equipment-specific search space overlap with each other in step S102, the mobile station apparatus 1 and the base station apparatus 3 insert 1 bit in either of the DCI formats (step S103), and the program returns to step S102 to compare again the bit number of the DCI format in which the bit has been inserted with that of the other DCI format. Note that it is previously decided in which DCI format the mobile station apparatus 1 and the base station apparatus 3 insert the bit. Namely, a priority of the DCI format in which the bit is inserted is previously decided.

For example, assume that the bit number of the DCI format 0/1A not including the carrier indicator which the mobile station apparatus 1 and the base station apparatus 3 have calculated in step S100 is 40 bits, the bit number of the DCI format 0/1A including the carrier indicator is 40 bits, and that the bit number of the DCI format 2 including the carrier indicator is 40 bits. When PRBs included in the downlink CC and the uplink CC to which the DCI format 0/1A including the carrier indicator corresponds are less than PRBs included in the downlink CC and the uplink CC to which the DCI format 0/1A not including the carrier indicator corresponds, a bit number (information bit number) of the DCI format 0/1A not including the carrier indicator and a bit number (information bit number) of the DCI format 0/1A including the carrier indicator may become the same as each other.

In step S103, an order to insert a bit is the order of the DCI format 0/1A allocated in the common search space, the DCI format 0/1A allocated in the user equipment-specific search space, and the DCI format 2 allocated in the user equipment-specific search space, and the mobile station apparatus 1 and the base station apparatus 3 store this order. In step S101, when the respective DCI formats are not allocated in the space where the common search space and the user equipment-specific search space overlap with each other, the mobile station apparatus 1 and the base station apparatus 3 use the bit numbers of the respective DCI formats calculated in step S100 as they are.

In step S102, since the bit number of the DCI format 0/1A which does not include the carrier indicator and which is allocated in the common search space, and the bit number of the DCI format 0/1A including the carrier indicator which is allocated in the user equipment-specific search space are respectively the same 40 bits, the mobile station apparatus 1 and the base station apparatus 3 insert 1 bit in the DCI format 0/1A including the carrier indicator which is allocated in the user equipment-specific search space (step S103), change the bit number of the DCI format 0/1A to 41 bits, and the program returns to step S102.

If the program returns to step S102, the mobile station apparatus 1 and the base station apparatus 3 insert 1 bit in the DCI format 2 which is allocated in the user equipment-specific search space (step S103), change the bit number of the DCI format 2 to 41 bits, and the program returns to step S102 since the bit number of the DCI format 0/1A including the carrier indicator which is allocated in the common search space, and the bit number of the DCI format 2 which is allocated in the user equipment-specific search space are respectively the same 40 bits.

If the program returns to step S102, the mobile station apparatus 1 and the base station apparatus 3 insert 1 bit in the DCI format 2 including the carrier indicator which is allocated in the user equipment-specific search space (step S103), change the bit number of the DCI format 2 to 42 bits, and the program returns to step S102 since the bit number of the DCI format 0/1A including the carrier indicator which is allocated in the user equipment-specific search space, and the bit number of the DCI format 2 including the carrier indicator which is allocated in the user equipment-specific search space are respectively the same 41 bits.

After the above-described step, since the bit number of the DCI format 0/1A not including the carrier indicator is 40 bits (a second payload size), the bit number of the DCI format 0/1A including the carrier indicator is 41 bits (the first payload size), the bit number of the DCI format 2 including the carrier indicator is 42 bits (the first payload size), and thus the bit numbers of the respective DCI formats are not the same as each other, the mobile station apparatus 1 and the base station apparatus 3 complete processing regarding calculation of the bit number of the DCI format.

As described above, the mobile station apparatus 1 and the base station apparatus 3 give priority to insertion of a bit in the DCI format allocated in the user equipment-specific search space and/or the DCI format including the carrier indicator over the DCI format allocated in the common search space so that the bit is not inserted in the DCI format allocated in the common search space, whereby the bit numbers of the DCI formats allocated in the common search space can be made to be the same between the mobile station apparatuses 1.

Note that since the DCI format can be identified from a value indicated by the carrier indicator when the values indicated by the respective carrier indicators of the DCI format 0/1A including the carrier indicator which is allocated in the user equipment-specific search space, and of the DCI format 2 including the carrier indicator which is allocated in the user equipment-specific search space are different from each other, the mobile station apparatus 1 and the base station apparatus 3 do not insert the bit in the DCI format 2 including the carrier indicator which is allocated in the user equipment-specific search space. Namely, the mobile station apparatus 1 and the base station apparatus 3 decide whether or not to insert the bit depending on whether the values indicated by the carrier indicators included in the respective two DCI formats of the same bit number are the same as each other or are different from each other.

The base station apparatus 3 generates a DCI format of the bit number of the DCI format calculated according to the flow chart of FIG. 6, encodes and modulates it, and transmits it through the PDCCH. The mobile station apparatus 1 performs blind decoding of the DCI format of the bit number of the DCI format calculated according to the flow chart of FIG. 6. Note that the mobile station apparatus 1 and the base station apparatus 3 may calculate the bit number of a DCI format for each subframe according to the flowchart of FIG. 6, and that may store the bit numbers previously calculated with respect to combinations of various DCI formats.

Note that step S101 may be omitted in the flow chart of FIG. 6. When the bit numbers of the DCI format allocated in the common search space and the DCI format allocated in the user equipment-specific search space are the same as each other regardless of overlapping or non-overlapping of the common search space and the user equipment-specific search space due to omission of step S101, a bit is inserted in the DCI format allocated in the user equipment-specific search space. As a result of this, although an unnecessary bit is inserted also in the DCI format allocated in the user equipment-specific search space which does not overlap with the common search space, apparatus configurations of the mobile station apparatus 1 and the base station apparatus 3 can be simplified.

Figure 7:
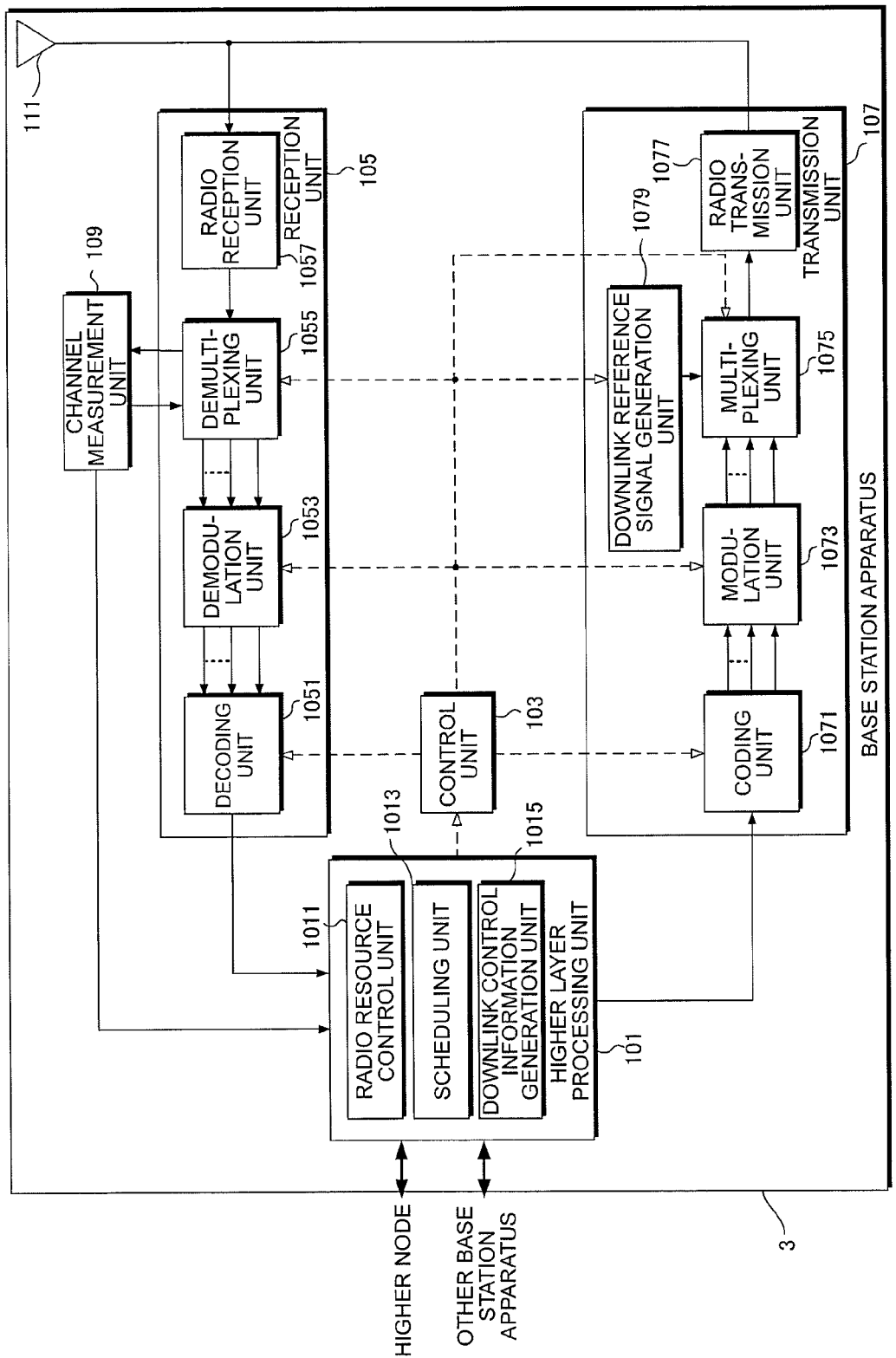
FIG. 7 is a schematic block diagram showing a configuration of the base station apparatus 3 of the present invention.

FIG. 7 is a schematic block diagram showing a configuration of the base station apparatus 3 of the present invention. As shown in the drawing, the base station apparatus 3 is configured to include an higher layer processing unit 101, a control unit 103, a reception unit 105, a transmission unit 107, a channel measurement unit 109, and a transmission/reception antenna 111. In addition, the higher layer processing unit 101 is configured to include a radio resource control unit 1011, a scheduling unit 1013, and a DCI generation unit 1015. In addition, the reception unit 105 is configured to include a decoding unit 1051, a demodulation unit 1053, a demultiplexing unit 1055, and a radio reception unit 1057. In addition, the transmission unit 107 is configured to include a coding unit 1071, a modulation unit 1073, a multiplexing unit 1075, a radio transmission unit 1077, and a DL RS generation unit 1079.

The higher layer processing unit 101 performs processing of a PDCP (Packet Data Convergence Protocol) layer, an RLC (Radio Link Control) layer, and an RRC (Radio Resource Control) layer. In addition, the higher layer processing unit 101 generate control information in order to control the reception unit 105 and the transmission unit 107 based on a scheduling result of the scheduling unit 1013 etc., and output the control information to the control unit 103. The radio resource control unit 1011 comprised in the higher layer processing unit 101 generates information to be allocated in a downlink PDSCH, or obtains it from an higher node, and outputs it to the transmission unit 107. In addition, the radio resource control unit 1011 manages various setting information of each mobile station apparatus 1. For example, the radio resource control unit 1011 manages RNTI, such as assignment of C-RNTI to the mobile station apparatus 1.

The scheduling unit 1013 comprised in the higher layer processing unit 101 performs scheduling, such as radio resource assignment, setting of a coding scheme, and setting of a modulation scheme based on uplink control information (ACK/NACK, channel quality information, a scheduling request) informed through the PUCCH from the mobile station apparatus 1, and a buffer condition informed from the mobile station apparatus 1 and various setting information of the each mobile station apparatus 1 set by the radio resource control unit 1011. The scheduling unit 1013 allocates a radio resource in which a specific mobile station apparatus 1 allocates the PUSCH among uplink radio resources. The scheduling unit 1013 gives priority to assignment of a radio resource with a good channel quality based on an uplink channel measurement result having input from the channel measurement unit 109 in allocating the radio resource in which the PUSCH is allocated to the specific mobile station apparatus 1.

In addition, the scheduling unit 1013 decides a radio resource in which the PDSCH is allocated among downlink radio resources. The scheduling unit 1013 outputs control information to the DCI generation unit 1015 so that the DCI generation unit 1015 may generate DCI indicating the radio resource assignment. In addition, the scheduling unit 1013 allocates a PDCCH candidate in which DCI having generated by the DCI generation unit 1015 is allocated from the common search space or the user equipment-specific search space. The scheduling unit 1013 selects a PDCCH candidate in which DCI including C-RNTI is allocated from the user equipment-specific search space of the mobile station apparatus 1 to which the C-RNTI has been assigned and the common search space.

The DCI generation unit 1015 comprised in the higher layer processing unit 101 generates DCI indicating uplink or downlink radio resource assignment based on the control information input from the scheduling unit 1013. The DCI generation unit 1015 inserts a bit in the DCI according to the flow chart of FIG. 6. Next, the DCI generation unit 1015 generates a CRC code from the generated DCI, and scrambles the generated CRC code with RNTI, and adds it to the DCI. When the DCI is the information indicating the radio resource assignment to the specific mobile station apparatus 1, the DCI generation unit 1015 scrambles the CRC code by the C-RNTI assigned to the mobile station apparatus 1.

The control unit 103 generates a control signal which performs control of the reception unit 105 and the transmission unit 107 based on the control information from the higher layer processing unit 101. The control unit 103 outputs the generated control signal to the reception unit 105 and the transmission unit 107, and performs control of the reception unit 105 and the transmission unit 107.

The reception unit 105 separates, demodulates, and decodes the received signal received from the mobile station apparatus 1 through the transmission/reception antenna 111 according to the control signal input from the control unit 103, and outputs the decoded information to the higher layer processing unit 101. The radio reception unit 1057 converts (down-converts) into an intermediate frequency the uplink signal received through the transmission/reception antenna 111, removes an unnecessary frequency component, controls an amplification level so that a signal level is maintained appropriately, orthogonally demodulates the signal based on an in-phase component and an orthogonal component of the received signal, and converts the orthogonally demodulated analog signal into a digital signal. The radio reception unit 1057 removes a portion corresponding to a GI (Guard Interval) from the converted digital signal. The radio reception unit 1057 performs FFT (Fast Fourier Transform) with respect to the signal from which the GI has been removed, extracts a signal in the frequency domain, and outputs it to the demultiplexing unit 1055.

The demultiplexing unit 1055 separates the signal input from the radio reception unit 1057 into signals, such as a PUCCH, a PUSCH, and a UL RS. Note that this separation is performed based on the radio resource assignment information which the base station apparatus 3 has previously decided in the scheduling unit 1013 and has informed each mobile station apparatus 1. In addition, the demultiplexing unit 1055 compensates a channel of the PUCCH and the PUSCH from an estimate value input from the channel measurement unit 109. In addition, the demultiplexing unit 1055 outputs the separated UL RS to the channel measurement unit 109.

The demodulation unit 1053 performs IDFT (Inverse Discrete Fourier Transform) of the PUSCH, obtains a modulation symbol, and demodulates the received signal with respect to each modulation symbol of the PUCCH and the PUSCH using a predetermined modulation scheme or a modulation scheme which the base station apparatus 3 has previously informed the each mobile station apparatus 1 by downlink control information, such as BPSK (Binary Phase Shift Keying), QPSK (Quadrature Phase Shift Keying), 16QAM (16 Quadrature Amplitude Modulation), and 64QAM (64 Quadrature Amplitude Modulation).

The decoding unit 1051 decodes encoded bits of the demodulated PUCCH and the PUSCH using a coding rate of a predetermined coding scheme, the coding rate being a predetermined or previously informed to the mobile station apparatus 1 by the base station apparatus 3 in the uplink grant, and outputs the decoded data information and the uplink control information to the higher layer processing unit 101. The channel measurement unit 109 measures an estimate value of the channel, a channel quality, etc. from the UL RS input from the demultiplexing unit 1055, and outputs them to the demultiplexing unit 1055 and the higher layer processing unit 101.

The transmission unit 107 generates a DL RS according to the control signal input from the control unit 103, encodes and modulates the data information and the DCI which have been input from the higher layer processing unit 101, multiplexes the PDCCH, the PDSCH, and the DL RS, and transmits the signal to the mobile station apparatus 1 through the transmission/reception antenna 111.

The coding unit 1071 performs coding, such as turbo coding, convolution coding, and block coding, which is previously set or decided by the scheduling unit 1013, of the DCI and the data information input from the higher layer processing unit 101. The modulation unit 1073 modulates an encoded bit input from the coding unit 1071 with a modulation scheme, such as QPSK, 16QAM, and 64QAM, which is previously set or decided by the scheduling unit 1013. The DL RS generation unit 1079 generates as a DL RS a known sequence of the mobile station apparatus 1 which can be calculated by a rule predetermined based on a cell ID for identifying the base station apparatus 3. The multiplexing unit 1075 multiplexes each modulated channel and the generated DL RS.

The radio transmission unit 1077 performs IFFT (Inverse Fast Fourier Transform) of the multiplexed modulation symbol to thereby perform modulation of an OFDM scheme, adds a GI to the OFDM-modulated OFDM symbol, generates a digital signal of a baseband, converts the digital signal of the baseband into an analog signal, generates an in-phase component and an orthogonal component of an intermediate frequency from the analog signal, removes an excessive frequency component with respect to an intermediate frequency band, converts (up-converts) a signal with the intermediate frequency into a signal with a high frequency, removes an excessive frequency component, amplifies power, and outputs the signal to the transmission/reception antenna 111 to transmit.

FIG. 8 is a schematic block diagram showing a configuration of the mobile station apparatus 1 of the present invention. As shown in the drawing, the mobile station apparatus 1 is configured to include an higher layer processing unit 201, a control unit 203, a reception unit 205, a transmission unit 207, a channel measurement unit 209, and a transmission/reception antenna 211. In addition, the higher layer processing unit 201 is configured to include a radio resource control unit 2011, a scheduling unit 2013, and a blind decoding control unit 2015. In addition, the reception unit 205 is configured to include a decoding unit 2051, a demodulation unit 2053, a demultiplexing unit 2055, and a radio reception unit 2057. In addition, the transmission unit 207 is configured to include a coding unit 2071, a modulation unit 2073, a multiplexing unit 2075, a radio transmission unit 2077, and a DL RS generation unit 2079.

The higher layer processing unit 201 outputs uplink data information generated by user operation etc. to the transmission unit 207. In addition, the higher layer processing unit 201 performs processing of the PDCP layer, the RLC layer, and the RRC layer. In addition, the higher layer processing unit 201 generates control information in order to control the reception unit 205 and the transmission unit 207 based on the DCI etc., and outputs the control information to the control unit 203. The radio resource control unit 2011 comprised in the higher layer processing unit 201 manages various setting information of the mobile station apparatus 1 itself. For example, the radio resource control unit 2011 manages RNTI, such as C-RNTI. In addition, the radio resource control unit 2011 generates information to be allocated in each uplink channel, and outputs it to the transmission unit 207.

The blind decoding control unit 2015 comprised in the higher layer processing unit 201 generates control information for controlling the reception unit 205 so that the reception unit 205 may perform blind decoding of the DCI of a DCI format to be detected by the mobile station apparatus 1 in the common search space and/or the user equipment-specific search space, and outputs the control information to the control unit 203. The blind decoding control unit 2015 generates control information for controlling the reception unit 205 so that reception unit 205 may perform blind decoding of the PDCCH including the C-RNTI in the common search space and the user equipment-specific search space, and outputs the control information to the control unit 203. In addition, the blind decoding control unit 2015 calculates as a bit of DCI a bit number of the DCI format to which blind decoding is performed according to the flow chart of FIG. 6.

The scheduling unit 2013 comprised in the higher layer processing unit 201 generates control information in order to control the reception unit 205 and the transmission unit 207 based on the DCI informed through the PDCCH from the base station apparatus 3, and various setting information of the mobile station apparatus 1 itself which the radio resource control unit 2011 set by a radio resource control signal informed through the PDSCH, and outputs the control information to the control unit 203. The scheduling unit 2013 controls the reception unit 205 so that the mobile station apparatus 1 may perform multiplex separation, demodulation, and decoding of the PDSCH based on downlink assignment input from the reception unit 205, generates control information for controlling the transmission unit 207 so that the mobile station apparatus 1 may perform coding of PUSCH, modulation, and multiplex of the PUSCH based on uplink grant input from the reception unit 205, and outputs the control information to the control unit 203.

The control unit 203 generates a control signal which performs control of the reception unit 205 and the transmission unit 207 based on the control information from the higher layer processing unit 201. The control unit 203 outputs the generated control signal to the reception unit 205 and the transmission unit 207, and performs control of the reception unit 205 and the transmission unit 207. The reception unit 205 separates, demodulates, and decodes the received signal received from the base station apparatus 3 through the transmission/reception antenna 211 according to the control signal input from the control unit 203, and outputs the decoded information to the higher layer processing unit 101.

The radio reception unit 2057 converts (down-converts) into an intermediate frequency the downlink signal received through the transmission/reception antenna 211, removes an unnecessary frequency component, controls an amplification level so that a signal level may be maintained appropriately, orthogonally demodulates the signal based on an in-phase component and an orthogonal component of the received signal, and converts the orthogonally demodulated analog signal into a digital signal. The radio reception unit 2057 removes a portion corresponding to a GI from the converted digital signal, performs FFT with respect to the signal from which the GI has been removed, and extracts signals of the frequency domain.

The demultiplexing unit 2055 separates the extracted signals into a PDCCH, a PDSCH, and a DL RS, respectively. Note that this separation is performed based on the radio resource assignment information informed by the DCI. In addition, the demultiplexing unit 2055 compensates a channel of the PUCCH and the PUSCH from an estimate value input from the channel measurement unit 209. In addition, the demultiplexing unit 2055 outputs the separated DL RS to the channel measurement unit 209.

The demodulation unit 2053 demodulates the PDCCH in a QPSK modulation scheme, and outputs it to the decoding unit 2051. When the decoding unit 2051 tried blind decoding of the PDCCH to succeed in the blind decoding, it outputs the decoded DCI and the RNTI included in the DCI to the higher layer processing unit 201. The demodulation unit 2053 demodulates the PDSCH in the modulation scheme informed by the DCI, such as QPSK, 16QAM, and 64QAM, and outputs it to the decoding unit 2051. The decoding unit 2051 decodes a coding rate informed by the DCI, and outputs the decoded data information to the higher layer processing unit 201.

The channel measurement unit 209 measures a downlink path loss from the DL RS input from the demultiplexing unit 2055, and outputs the measured path loss to the higher layer processing unit 201. In addition, the channel measurement unit 209 calculates an estimate value of a downlink channel from the DL RS, and outputs it to the demultiplexing unit 2055.

The transmission unit 207 generates a UL RS according to the control signal input from the control unit 203, encodes and modulates the data information input from the higher layer processing unit 201, multiplexes the PUCCH, the PUSCH, and the generated UL RS, and transmits them to the base station apparatus 3 through the transmission/reception antenna 211. The coding unit 2071 encodes the uplink control information input from the higher layer processing unit 201 using convolution coding, block coding, etc., and performs turbo coding of the data information based on the coding rate informed by the DCI. The modulation unit 2073 modulates the encoded bit input from the coding unit 2071 with a modulation scheme informed by DCI, such as BPSK, QPSK, 16QAM, or a modulation scheme predetermined for each channel.

The UL RS generation unit 2079 generates a known sequence of the base station apparatus 3 which can be calculated by a rule predetermined based on a cell ID for identifying the base station apparatus 3, a bandwidth in which the UL RS is allocated, etc. The multiplexing unit 2075 performs DFT (Discrete Fourier Transform) after reallocating the modulation symbols of the PUSCH in parallel according to the control signal input from the control unit 203, and multiplexes the signals of the PUCCH and the PUSCH, and the generated UL RS.

The radio transmission unit 2077 performs IFFT of the multiplexed signal to thereby perform modulation of an SC-FDMA scheme, adds a GI to the SC-FDMA-modulated SC-FDMA symbol, generates a digital signal of a baseband, converts the digital signal of the baseband into an analog signal, generates an in-phase component and an orthogonal component of an intermediate frequency from the analog signal, removes an excessive frequency component with respect to an intermediate frequency band, converts (up-converts) a signal with the intermediate frequency into a signal with a high frequency, removes an excessive frequency component, amplifies power, and outputs the signal to the transmission/reception antenna 211 to transmit.

As described above, according to the present invention, in a wireless communication system comprising a plurality of mobile station apparatuses 1 and a base station apparatus 3 which transmits DCI to the plurality of mobile station apparatuses 1 through a PDCCH, when respective bit numbers of a DCI format not including a carrier indicator and a DCI format including the carrier indicator are the same as each other, the base station apparatus 3 inserts 1 bit in the DCI format including the carrier indicator, and the mobile station apparatus 1 decodes the DCI format determining that 1 bit has been inserted in the DCI format including the carrier indicator.

It is to be noted that according to the present invention, the above-described DCI format not including the carrier indicator and the DCI format including the carrier indicator may be the same DCI format. In addition, according to the present invention, when the respective bit numbers of the DCI format allocated in the common search space and the DCI format allocated in the user equipment-specific search space are the same as each other, the base station apparatus 3 inserts 1 bit in the DCI format allocated in the user equipment-specific search space, and the mobile station apparatus 1 decodes the DCI format determining that 1 bit has been inserted in the DCI format allocated in user equipment-specific search space.

In addition, according to the present invention, only when the DCI format is allocated in the space where the common search space and the user equipment-specific search space overlap with each other, the base station apparatus 3 inserts a bit in the DCI format, and the mobile station apparatus 1 decodes the DCI format determining that the bit has been inserted in the DCI format. As a result of this, the mobile station apparatus 1 can identify a type of the DCI format allocated in the space where the common search space and the user equipment-specific search space overlap with each other from a difference in the bit number of the DCI format, i.e., a difference of a decoding method.

(Second embodiment)

Hereinafter, a second embodiment of the present invention will be described in detail with reference to the drawings.

In the second embodiment of the present invention, when the common search space and the user equipment-specific search space overlap with each other, and the bit numbers of the DCI format allocated in the common search space and the DCI format allocated in the user equipment-specific search space are the same as each other, the base station apparatus 3 does not allocate the DCI format allocated in the user equipment-specific search space in the overlapped space, and the mobile station apparatus 1 performs blind decoding in the overlapped space only of the DCI format allocated in the common search space.

For example, when allocating the DCI format 0/1A of 40 bit in the common search space, and allocating the DCI format 2 of 40 bit and the DCI format 0A of 41 bit in the user equipment-specific search space, the base station apparatus 3 allocates the DCI format 0/1A and the DCI format 0A in the space where the common search space and the mobile station apparatus search space overlap with each other, and does not allocate the DCI format 2 of the same bit number as the DCI format 0/1A allocated in the common search space, and the mobile station apparatus 1 performs blind decoding of the DCI format 0/1A and the DCI format 0A in the space where the common search space and the mobile station apparatus search space overlap with each other, and does not perform blind decoding of the DCI format 2 of the same bit number as the DCI format 0/1A allocated in the common search space.

When compared a wireless communication system according to the embodiment with the wireless communication system according to the first embodiment, there is a difference in the higher layer processing unit 101 of the base station apparatus 3 and the higher layer processing unit 201 of the mobile station apparatus 1. However, since configurations and functions of the other components are the same as in the first embodiment, a description of the same functions as in the first embodiment is omitted.

The DCI generation unit 1015 of the higher layer processing unit 101 of the base station apparatus 3 of the second embodiment does not insert a bit in a DCI format based on the flow chart of FIG. 6. In addition, the scheduling unit 1013 of the higher layer processing unit 101 controls the transmission unit 107 through the control unit 103 so as not to allocate the DCI format allocated in the user equipment-specific search space of the same bit number as the DCI format allocated in the common search space in the space where the common search space and the user equipment-specific search space overlap with each other.

The blind decoding control unit 2015 of the higher layer processing unit 201 of the mobile station apparatus 1 of the second embodiment does not calculate a bit number determining that the bit has been inserted in the DCI format based on the flow chart of FIG. 6. In addition, the blind decoding control unit 2015 controls the reception unit 205 through the control unit 203 so that the reception unit 205 may not perform blind decoding of the DCI format allocated in the user equipment-specific search space of the same bit number as the DCI format allocated in the common search space in the space where the common search space and the user equipment-specific search space overlap with each other.

As a result of this, the mobile station apparatus 1 can identify a type of a DCI format allocated in the common search space and the user equipment-specific search space.

(Third embodiment)

Hereinafter, a third embodiment of the present invention will be described in detail with reference to the drawings.

FIG. 9 is a schematic diagram showing one example of a search space according to the third embodiment of the present invention. In the third embodiment of the present invention, when the common search space and the user equipment-specific search space overlap with each other as a PDCCH candidate comprised of CCEs of No. 8 to No. 15 in FIG. 9 (PDCCH candidate hatched with net-like lines of FIG. 9) (T100), the mobile station apparatus 1 and the base station apparatus 3 change a PDCCH candidate configuring the user equipment-specific search space from the PDCCH candidate of the user equipment-specific search space which overlaps with the common search space to a PDCCH candidate comprised of CCEs of No. 24 to No. 31 which are not included in the common search space (T101).

When compared a wireless communication system according to the embodiment with the wireless communication system according to the first embodiment, there is a difference in the higher layer processing unit 101 of the base station apparatus 3 and the higher layer processing unit 201 of the mobile station apparatus 1. However, since configurations and functions of the other components are the same as in the first embodiment, a description of the same functions as in the first embodiment is omitted.

The DCI generation unit 1015 of the higher layer processing unit 101 of the base station apparatus 3 of the second embodiment does not insert a bit in a DCI format based on the flow chart of FIG. 6. In addition, when the common search space and the user equipment-specific search space overlap with each other the scheduling unit 1013 of the higher layer processing unit 101 changes a PDCCH candidate configuring the user equipment-specific search space from a PDCCH candidate of the user equipment-specific search space which overlaps with the common search space to a PDCCH candidate which is not included in the common search space.

The blind decoding control unit 2015 of the higher layer processing unit 201 of the mobile station apparatus 1 of the second embodiment does not calculate a bit number determining that the bit has been inserted in the DCI format based on the flow chart of FIG. 6. In addition, when the common search space and the user equipment-specific search space overlap with each other, the blind decoding control unit 2015 changes a PDCCH candidate configuring the user equipment-specific search space from a PDCCH candidate of the user equipment-specific search space which overlaps with the common search space to a PDCCH candidate which is not included in the common search space.

As a result of this, since the mobile station apparatus 1 can identify the type of the DCI format allocated in the common search space and the user equipment-specific search space without inserting a bit in the DCI format as in the first embodiment, it can keep low a coding rate of the PDCCH, the DCI, or the DCI format. In addition, since the PDCCH candidate is not limited in which the DCI format allocated in the user equipment-specific search space and with the same bit number as the DCI format allocated in the common search space can be allocated as in the second embodiment, a degree of freedom of allocation of a DCI format is kept.

Hereinafter, a modified example of a third embodiment of the present invention will be described in detail with reference to the drawings.

In the modified example of the third embodiment of the present invention, the mobile station apparatus 1 and the base station apparatus 3 do not include a PDCCH candidate comprised of CCEs of No. 0 to No. 15 configuring the common search space of FIG. 9 in the user equipment-specific search spaces in which the number of CCEs configuring the PDCCH candidate is the same 4 or 8 as in the common search space.

Specifically, a CCE and a PDCCH candidate configuring the user equipment-specific search space can be calculated by inputting in a hashing function C-RNTI having assigned to the mobile station apparatus 1 and the number for identifying a subframe, etc. In the modified example of the third embodiment, in deciding the user equipment-specific search spaces in which the number of CCEs configuring the PDCCH candidate is the same 4 or 8 as in the common search space, the mobile station apparatus 1 and the base station apparatus 3 decides a user equipment-specific search space from the CCEs of No. 16 to No. 47 excluding No. 0 to No. 15 of FIG. 9, and in deciding a user equipment-specific search spaces in which the number of CCEs configuring the PDCCH candidate is 1 and 2 different from the common search space, the mobile station apparatus 1 and the base station apparatus 3 decides a user equipment-specific search space from all the CCEs of No. 0 to No. 47 of FIG. 9.

There is the following difference between the third embodiment and the modified example of the third embodiment: in the third embodiment, the mobile station apparatus 1 and the base station apparatus 3 decide a user equipment-specific search space from all the CCEs, and change the user equipment-specific search space so that the common search space and the user equipment-specific search space may not overlap with each other when the common search space and the user equipment-specific search space overlap with each other; while in the modified example of the third embodiment, in deciding a user equipment-specific search spaces in which the number of CCEs configuring the PDCCH candidate is the same as that of the common search space, the mobile station apparatus 1 and the base station apparatus 3 decides a user equipment-specific search space from the CCEs excluding the CCE used for the common search space so that the common search space and the user equipment-specific search space may not overlap with each other.

As a result of this, since the mobile station apparatus 1 can identify the type of the DCI format allocated in the common search space and the user equipment-specific search space without inserting a bit in the DCI format as in the first embodiment, it can keep low a coding rate of the PDCCH, the DCI, or the DCI format. In addition, since the PDCCH candidate is not limited in which the DCI format allocated in the user equipment-specific search space and with the same bit number as the DCI format allocated in the common search space can be allocated as in the second embodiment, a degree of freedom of allocation of a DCI format is kept.

A program that operates in the base station apparatus 3 and the mobile station apparatus 1 according to the present invention may be the program (program that makes a computer operate) that controls a CPU (Central Processing Unit) etc. so as to achieve a function in the above-mentioned embodiment according to the present invention. Additionally, information dealt with in these apparatuses is temporarily stored in RAM (Random Access Memory) at the time of processing thereof, subsequently stored in various ROMs, such as a Flash ROM (Read Only Memory), and a HDD (Hard Disk Drive), and the information is read, corrected/written by the CPU if needed.

Note that a part of the mobile station apparatus 1 and the base station apparatus 3 in the above-mentioned embodiment may be achieved with a computer. In that case, the computer may be achieved by recording a program for achieving the above-described control function in a computer-readable recording medium, and making the program recorded in this recording medium read in a computer system to be executed. Note that a "computer system" referred to herein is defined to be the computer system incorporated in the mobile station apparatus 1 or the base station apparatus 3, and to include hardwares, such as an OS and a peripheral device.

In addition, a "computer-readable recording medium" means a portable medium, such as a flexible disk, a magnetic optical disk, a ROM, and a CD-ROM, and a memory storage incorporated in the computer system, such as a hard disk. Further, the "computer-readable recording medium" may also include a medium that dynamically holds a program for a short time as a communication wire used when the program is transmitted through a communication line, such as a network like the Internet, and a telephone line, and a medium that holds a program for a certain time as a volatile memory inside the computer system serving as a server or a client when the program is dynamically held for the short time. In addition, the above-described program may be the program for achieving a part of the above-mentioned function, and it may be the program in which the above-mentioned function can be achieved in combination with the program having been already recorded in the computer system.

In addition, a part or all of the mobile station apparatus 1 and the base station apparatus 3 in the above-mentioned embodiment may be achieved as an LSI, which typically is an integrated circuit. Each functional block of the mobile station apparatus 1 and the base station apparatus 3 may be formed into chips individually, or some or all of them may be integrated to form a chip. In addition, a technique for making the functional blocks into an integrated circuit may be achieved not only as the LSI but as a dedicated circuit or a general-purpose processor. In addition, when a technology for making the functional blocks into the integrated circuit as an alternative to the LSI appears due to progress of a semiconductor technology, it is also possible to use an integrated circuit made by the technology.

(A) In addition, the invention in this application can employ the following aspect. Namely, a wireless communication system of the present invention is the wireless communication system comprising a mobile station apparatus and a base station apparatus which transmits control information to the mobile station apparatus, wherein when an information bit number of a first format which is the format of the control information, and which includes information indicating a CC is a predetermined bit number, the base station apparatus inserts at least 1 bit in the first format to decide a first payload size, and transmits the first format of the first payload size to the mobile station apparatus, and the mobile station apparatus performs reception processing of the first format determining that the first format is the first payload size.

(B) In addition, in the wireless communication system of the present invention, the predetermined bit number is a bit number of a payload size of a second format which is the format of the control information and which does not include information indicating a CC.

(C) In addition, in the wireless communication system of the present invention, the first format is the format including information indicating a CC in the second format.

(D) In addition, in the wireless communication system of the present invention, the second format is allocated in a common search space, and the first format is allocated in a user equipment-specific search space.

(E) In addition, in the wireless communication system of the present invention, when allocating the first format in a space where the common search space and the user equipment-specific search space overlap with each other, the base station apparatus inserts a bit in the first format, and when the first format is allocated in the space where the common search space and the user equipment-specific search space overlap with each other, the mobile station apparatus performs reception processing determining that the bit has been inserted in the second format.

(F) In addition, in the wireless communication system of the present invention, the first format and the second format are control information transmitted to the same mobile station apparatus.

(G) In addition, a wireless communication system of the present invention is the wireless communication system comprising a mobile station apparatus and a base station apparatus which transmits control information to the mobile station apparatus, wherein when a bit number of a first format which is the format of the control information and which is allocated in a common search space, and a bit number of a second format which is the format of the control information and which is allocated in a user equipment-specific search space are the same as each other, the base station apparatus does not allocate the second format but allocates only the first format in a space where the common search space and the user equipment-specific search space overlap with each other, and transmits the first format, and when the bit number of the first format which is the format of the control information and which is allocated in the common search space, and the bit number of the second format which is the format of the control information and which is allocated only in the user equipment-specific search space are the same as each other, the mobile station apparatus does not perform reception processing of the second format, but only performs reception processing of the first format in the space where the common search space and the user equipment-specific search space overlap with each other.

(H) In addition, a wireless communication system of the present invention is the wireless communication system comprising a mobile station apparatus and a base station apparatus which transmits control information to the mobile station apparatus, wherein the base station apparatus and the mobile station apparatus configure a common search space from a predetermined CCE, configure a user equipment-specific search space in which the number of CCEs configuring a PDCCH candidate is the same as that of a common search space from the CCEs excluding the CCEs used for the common search space, and configure from all the CCEs the user equipment-specific search space in which the number of CCEs configuring the PDCCH candidate is different from that of the common search space.

(I) In addition, a base station apparatus of the present invention is the base station apparatus which transmits control information to a mobile station apparatus, wherein when an information bit number of a first format which is the format of the control information, and which includes information indicating a CC is a predetermined bit number, the base station apparatus inserts at least 1 bit in the first format to decide a first payload size, and transmits the first format of the first payload size to the mobile station apparatus, (J) In addition, a base station apparatus of the present invention is the base station apparatus which transmits control information to a mobile station apparatus, wherein when a bit number of a first format which is the format of the control information and which is allocated in a common search space, and a bit number of a second format which is the format of the control information and which is allocated in a user equipment-specific search space are the same as each other, the base station apparatus does not allocate the second format but allocates only the first format in a space where the common search space and the user equipment-specific search space overlap with each other, and transmits the first format.

(K) In addition, a base station apparatus of the present invention is the base station apparatus which transmits control information to a mobile station apparatus, wherein the base station apparatus configures a common search space from a predetermined CCE, configures a user equipment-specific search space in which the number of CCEs configuring a PDCCH candidate is the same as that of a common search space from the CCEs excluding the CCEs used for the common search space, and configures from all the CCEs the user equipment-specific search space in which the number of the CCEs configuring the PDCCH candidate is different from that of the common search space.

(L) In addition, a mobile station apparatus of the present invention is the mobile station apparatus which receives control information transmitted from a base station apparatus, wherein the mobile station apparatus receives a first format determining that the first format which is the format of the control information and which includes information indicating a CC is a first payload size decided by the base station apparatus inserting at least 1 bit in the first format.

(M) In addition, a mobile station apparatus of the present invention is the mobile station apparatus which receives control information transmitted from a base station apparatus, wherein when a bit number of a first format which is the format of the control information and which is allocated in a common search space, and a bit number of a second format which is the format of the control information and which is allocated only in a user equipment-specific search space are the same as each other, the mobile station apparatus does not perform reception processing of the second format, but only performs reception processing of the first format in the space where the common search space and the user equipment-specific search space overlap with each other.

(N) In addition, a mobile station apparatus of the present invention is the mobile station apparatus which receives control information transmitted from a base station apparatus, wherein the mobile station apparatus configures a common search space from a predetermined CCE, configures a user equipment-specific search space in which the number of CCEs configuring a PDCCH candidate is the same as that of the common search space from the CCEs excluding the CCEs used for the common search space, and configures from all the CCEs the user equipment-specific search space in which the number of the CCEs configuring the PDCCH candidate is different from that of the common search space.

(O) In addition, a wireless communication method of the present invention is the wireless communication method used for a base station apparatus which transmits control information to a mobile station apparatus, and the wireless communication method comprises: means for inserting at least 1 bit in a first format to decide a first payload size; and means for transmitting the first format of the first payload size to the mobile station apparatus when an information bit number of the first format which is the format of the control information and which includes information indicating a CC is a predetermined bit number, (P) In addition, a wireless communication method of the present invention is the wireless communication method used for a base station apparatus which transmits control information to a mobile station apparatus, and the wireless communication method comprises: means for not allocating a second format but allocates only a first format in a space where a common search space and a user equipment-specific search space overlap with each other; and means for transmitting the first format when a bit number of the first format which is the format of the control information and which is allocated in the common search space, and a bit number of the second format which is the format of the control information and which is allocated in the user equipment-specific search space are the same as each other.

(Q) In addition, a wireless communication method of the present invention is the wireless communication method used for a base station apparatus which transmits control information to a mobile station apparatus, and the wireless communication method comprises: means for configuring a common search space from a predetermined CCE; means for configuring a user equipment-specific search space in which the number of CCEs configuring a PDCCH candidate is the same as that of the common search space from the CCEs excluding the CCEs used for the common search space; and means for configuring from all the CCEs the user equipment-specific search space in which the number of the CCEs configuring the PDCCH candidate is different from that of the common search space.

(R) In addition, a wireless communication method of the present invention is the wireless communication method used for a mobile station apparatus which receives control information transmitted from a base station apparatus, and the wireless communication method comprises means for receiving a first format determining that the first format which is the format of the control information and which includes information indicating a CC is a first payload size decided by the base station apparatus inserting at least 1 bit in the first format.

(S) In addition, a wireless communication method of the present invention is the wireless communication method used for a mobile station apparatus which receives control information transmitted from a base station apparatus, and the wireless communication method comprises means for not performing reception processing of a second format, but only performing reception processing of a first format in a space where a common search space and a user equipment-specific search space overlap with each other when a bit number of the first format which is the format of the control information and which is allocated in the common search space, and a bit number of the second format which is the format of the control information and which is allocated only in the user equipment-specific search space are the same as each other.

(T) In addition, a wireless communication method of the present invention is the wireless communication method used for a mobile station apparatus which receives control information transmitted from a base station apparatus, and the wireless communication method comprises: means for configuring a common search space from a predetermined CCE; means for configuring a user equipment-specific search space in which the number of CCEs configuring a PDCCH candidate is the same as that of the common search space from the CCEs excluding the CCEs used for the common search space; and means for configuring from all the CCEs the user equipment-specific search space in which the number of the CCEs configuring the PDCCH candidate is different from that of the common search space.

(U) In addition, an integrated circuit of the present invention is the integrated circuit used for a base station apparatus which transmits control information to a mobile station apparatus, and the integrated circuit comprises: means for inserting at least 1 bit in the first format to decide a first payload size; and means for transmitting the first format of the first payload size to the mobile station apparatus when an information bit number of the first format which is the format of the control information and which includes information indicating a CC is a predetermined bit number.

(V) In addition, an integrated circuit of the present invention is the integrated circuit used for a base station apparatus which transmits control information to a mobile station apparatus, and the integrated circuit comprises: means for not allocating a second format but allocates only a first format in a space where a common search space and a user equipment-specific search space overlap with each other; and means for transmitting the first format when a bit number of the first format which is the format of the control information and which is allocated in the common search space, and a bit number of the second format which is the format of the control information and which is allocated in the user equipment-specific search space are the same as each other.

(W) In addition, an integrated circuit of the present invention is the integrated circuit used for a base station apparatus which transmits control information to a mobile station apparatus, and the integrated circuit comprises: means for configuring a common search space from a predetermined CCE; means for configuring a user equipment-specific search space in which the number of CCEs configuring a PDCCH candidate is the same as that of the common search space from the CCEs excluding the CCEs used for the common search space; and means for configuring from all the CCEs the user equipment-specific search space in which the number of the CCEs configuring the PDCCH candidate is different from that of the common search space.

(X) In addition, an integrated circuit of the present invention is the integrated circuit used for a mobile station apparatus which receives control information transmitted from a base station apparatus, and the integrated circuit comprises means for receiving a first format determining that the first format which is the format of the control information and which includes information indicating a CC is a first payload size decided by the base station apparatus inserting at least 1 bit in the first format.

(Y) In addition, an integrated circuit of the present invention is the integrated circuit used for a mobile station apparatus which receives control information transmitted from a base station apparatus, and the integrated circuit comprises means for not performing reception processing of a second format, but only performing reception processing of a first format in a space where a common search space and a user equipment-specific search space overlap with each other when a bit number of the first format which is the format of the control information and which is allocated in the common search space, and a bit number of the second format which is the format of the control information and which is allocated only in the user equipment-specific search space are the same as each other.

(Z) In addition, an integrated circuit of the present invention is the integrated circuit used for a mobile station apparatus which receives control information transmitted from a base station apparatus, and the integrated circuit comprises: means for configuring a common search space from a predetermined CCE; means for configuring a user equipment-specific search space in which the number of CCEs configuring a PDCCH candidate is the same as that of the common search space from the CCEs excluding the CCEs used for the common search space; and means for configuring from all the CCEs the user equipment-specific search space in which the number of the CCEs configuring the PDCCH candidate is different from that of the common search space.

As described above, although one embodiment of the present invention has been described in detail with reference to the drawings, a specific configuration is not limited to the above, and various changes of a design etc. can be made without departing from the scope of the present invention.

Description of Symbols
1 (1A, 1B, and 1C) MOBILE STATION APPARATUS
3 BASE STATION APPARATUS
101 HIGHER LAYER PROCESSING UNIT
103 CONTROL UNIT
105 RECEPTION UNIT
107 TRANSMISSION UNIT
109 CHANNEL MEASUREMENT UNIT
201 HIGHER LAYER PROCESSING UNIT
203 CONTROL UNIT
205 RECEPTION UNIT
207 TRANSMISSION UNIT
209 CHANNEL MEASUREMENT UNIT
1013 SCHEDULING UNIT
1015 DCI GENERATION UNIT
2013 SCHEDULING UNIT
2015 BLIND DECODING CONTROL UNIT

The invention claimed is:

1. A terminal apparatus configured to and/or programmed to communicate with a base station apparatus, the terminal apparatus comprising:

a receiving unit configured to and/or programmed to be set to monitor physical downlink control channel candidates in a common search space and a user equipment-specific search space on a downlink component carrier, which are with cyclic redundancy check scrambled by C-RNTI (Cell Radio Network Temporary Identifier), with a first control channel element index, and with downlink control information of a common payload size and different sets of downlink control information fields, wherein the receiving unit is configured to and/or programmed to assume that, for the physical downlink control channel candidates with the cyclic redundancy check scrambled by the C-RNTI, only one of a physical downlink control channel in the common search space and a physical downlink control channel in the user equipment-specific search space is transmitted on the downlink component carrier.

2. The terminal apparatus according to claim 1, wherein in a case that the terminal apparatus is configured with a carrier indicator field associated with monitoring a physical downlink control channel on the downlink component carrier, the receiving unit is configured to assume that, for the physical downlink control channel candidates with the cyclic redundancy check scrambled by the C-RNTI, only the physical downlink control channel in the common search space is transmitted on the downlink component carrier.

3. The terminal apparatus according to claim 1, wherein the physical downlink control channel candidates in the common search space and the user equipment-specific search space are comprised of a same number of control channel elements.

4. The terminal apparatus according to claim 1, wherein each physical downlink control channel candidate of said physical downlink control channel candidates has one or more control channel element indices including the first control channel element index, for said each physical downlink control channel candidate, the first control channel element index is the lowest in value among the one or more control channel element indices, and a value of the first control channel element index is the same among the physical downlink control channel candidates.

5. A base station apparatus configured to and/or programmed to communicate with a terminal apparatus, the base station comprising:

a transmitting unit configured to and/or programmed to transmit a physical downlink control channel in physical downlink control channel candidates in a common search space and a user equipment-specific search space on a downlink component carrier, which are with cyclic redundancy check scrambled by C-RNTI (Cell Radio Network Temporary Identifier), with a first control channel element index, and with downlink control information of a common payload size and different sets of downlink control information fields, wherein the transmitting unit is configured to and/or programmed to transmit, for the physical downlink control channel candidates with the cyclic redundancy check scrambled by the C-RNTI, only one of the physical downlink control channel in the common search space and the physical downlink control channel in the user equipment-specific search space on the downlink component carrier.

6. The base station apparatus according to claim 5, wherein in a case that the terminal apparatus is configured with a carrier indicator field associated with monitoring the physical downlink control channel on the downlink component carrier, the transmitting unit is configured to transmit, for the physical downlink control channel candidates with the cyclic redundancy check scrambled by the C-RNTI, only the physical downlink control channel in the common search space on the downlink component carrier.

7. The base station apparatus according to claim 5, wherein the physical downlink control channel candidates in the common search space and the user equipment-specific search space are comprised of a same number of control channel elements.

8. The base station apparatus according to claim 5, wherein each physical downlink control channel candidate of said physical downlink control channel candidates has one or more control channel element indices including the first control channel element index, for said each physical downlink control channel candidate, the first control channel element index is the lowest in value among the one or more control channel element indices, and a value of the first control channel element index is the same among the physical downlink control channel candidates.

9. A communication method used for a terminal apparatus that is configured to and/or programmed to communicate with a base station apparatus, the communication method comprising:

being set to monitor physical downlink control channel candidates in a common search space and a user equipment-specific search space on a downlink component carrier, which are with cyclic redundancy check scrambled by C-RNTI (Cell Radio Network Temporary Identifier), with a first control channel element index, and with downlink control information of a common payload size and different sets of downlink control information fields, and assuming that, for the physical downlink control channel candidates with the cyclic redundancy check scrambled by the C-RNTI, only one of a physical downlink control channel in the common search space and a physical downlink control channel in the user equipment-specific search space is transmitted on the downlink component carrier.

10. The communication method according to claim 9, further comprising:

in a case that the terminal apparatus is configured with a carrier indicator field associated with monitoring a physical downlink control channel on the downlink component carrier, assuming that, for the physical downlink control channel candidates with the cyclic redundancy check scrambled by the C-RNTI, only the physical downlink control channel in the common search space is transmitted on the downlink component carrier.

11. The communication method according to claim 9, wherein the physical downlink control channel candidates in the common search space and the user equipment-specific search space are comprised of a same number of control channel elements.

12. The communication method according to claim 9, wherein each physical downlink control channel candidate of said physical downlink control channel candidates has one or more control channel element indices including the first control channel element index, for said each physical downlink control channel candidate, the first control channel element index is the lowest in value among the one or more control channel element indices, and a value of the first control channel element index is the same among the physical downlink control channel candidates.

13. A communication method used for a base station apparatus that is configured to and/or programmed to communicate with a terminal apparatus, the communication method comprising:

transmitting a physical downlink control channel in physical downlink control channel candidates in a common search space and a user equipment-specific search space on a downlink component carrier, which are with cyclic redundancy check scrambled by C-RNTI (Cell Radio Network Temporary Identifier), with a first control channel element index, and with downlink control information of a common payload size and different sets of downlink control information fields, and transmitting, for the physical downlink control channel candidates with the cyclic redundancy check scrambled by the C-RNTI, only one of the physical downlink control channel in the common search space and the physical downlink control channel in the user equipment-specific search space on the downlink component carrier.

14. The communication method according to claim 13, further comprising:

in a case that the terminal apparatus is configured with a carrier indicator field associated with monitoring the physical downlink control channel on the downlink component carrier, transmitting, for the physical downlink control channel candidates with the cyclic redundancy check scrambled by the C-RNTI, only the physical downlink control channel in the common search space on the downlink component carrier.

15. The communication method according to claim 13, wherein the physical downlink control channel candidates in the common search space and the user equipment-specific search space are comprised of a same number of control channel elements.

16. The communication method according to claim 13, wherein each physical downlink control channel candidate of said physical downlink control channel candidates has one or more control channel element indices including the first control channel element index, for said each physical downlink control channel candidate, the first control channel element index is the lowest in value among the one or more control channel element indices, and a value of the first control channel element index is the same among the physical downlink control channel candidates.

* * * * *